US 012067666 B2

United States Patent
Du et al.

(10) Patent No.: US 12,067,666 B2
(45) Date of Patent: Aug. 20, 2024

(54) RUN-TIME MECHANISM FOR OPTIMAL SHADER

(71) Applicant: QUALCOMM Incorporated, San Diego, CA (US)

(72) Inventors: Yun Du, San Diego, CA (US); Eric Demers, San Diego, CA (US); Andrew Evan Gruber, Arlington, MA (US); Chun Yu, Rancho Santa Fe, CA (US); Chihong Zhang, San Diego, CA (US); Baoguang Yang, Fremont, CA (US); Yuehai Du, San Diego, CA (US); Gang Zhong, San Diego, CA (US); Avinash Seetharamaiah, San Diego, CA (US); Jonnala Gadda Nagendra Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 17/664,033

(22) Filed: May 18, 2022

(65) Prior Publication Data

US 2023/0377240 A1 Nov. 23, 2023

(51) Int. Cl.
*G06T 15/00* (2011.01)
*G06T 1/60* (2006.01)

(52) U.S. Cl.
CPC .............. *G06T 15/005* (2013.01); *G06T 1/60* (2013.01)

(58) Field of Classification Search
CPC .......... G06T 15/005; G06T 1/60; G06F 9/451
See application file for complete search history.

(56) References Cited

U.S. PATENT DOCUMENTS

| 9,799,094 | B1 | 10/2017 | Chen et al. |
| 9,836,869 | B2 | 12/2017 | Tsai et al. |
| 10,395,414 | B2 | 8/2019 | Panneer et al. |
| 11,132,326 | B1 | 9/2021 | Modukuri et al. |
| 2011/0084976 | A1* | 4/2011 | Duluk, Jr. ............. G06T 15/005 345/522 |

(Continued)

OTHER PUBLICATIONS

International Search Report and Written Opinion—PCT/US2023/021938—ISA/EPO—Aug. 1, 2023.

*Primary Examiner* — Jitesh Patel
(74) *Attorney, Agent, or Firm* — QUALCOMM Incorporated

(57) ABSTRACT

Aspects presented herein relate to methods and devices for graphics processing including an apparatus, e.g., a GPU. The apparatus may receive a set of draw call instructions corresponding to a graphics workload, where the set of draw call instructions is associated with at least one run-time parameter. The apparatus may also obtain a first shader program associated with storing data in a system memory and at least one second shader program associated with storing data in a constant memory. Further, the apparatus may execute the first shader program or the at least one second shader program based on whether the at least one run-time parameter is less than or equal to a size of the constant memory. The apparatus may also update or maintain a configuration of a shader processor or a streaming processor based on executing the first shader program or the at least one second shader program.

30 Claims, 11 Drawing Sheets

(56) References Cited

U.S. PATENT DOCUMENTS

| | | | |
|---|---|---|---|
| 2013/0169642 A1* | 7/2013 | Frascati | G06T 17/10 345/426 |
| 2014/0267259 A1* | 9/2014 | Frascati | G06T 15/005 345/423 |
| 2015/0379663 A1* | 12/2015 | Gruber | G06T 1/20 345/522 |
| 2018/0165786 A1 | 6/2018 | Bourd et al. | |
| 2018/0232846 A1* | 8/2018 | Gruber | G06T 15/005 |
| 2018/0286115 A1* | 10/2018 | Surti | G06T 5/20 |
| 2020/0380757 A1* | 12/2020 | Howson | G06T 1/20 |
| 2020/0410631 A1* | 12/2020 | Doyle | G06T 1/20 |
| 2021/0150663 A1 | 5/2021 | Maiyuran et al. | |

* cited by examiner

RUN-TIME MECHANISM FOR OPTIMAL SHADER

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a central processing unit (CPU), or any apparatus that may perform graphics processing. The apparatus may receive a set of draw call instructions corresponding to a graphics workload, where the set of draw call instructions is associated with at least one run-time parameter corresponding to information available at a run-time for the graphics workload. The apparatus may also detect whether an index value (i) is less than the at least one run-time parameter; and increment the index value (i) if the index value (i) is less than the at least one run-time parameter. Additionally, the apparatus may obtain a first shader program associated with storing data in a system memory and at least one second shader program associated with storing the data in a constant memory. The apparatus may also calculate whether the at least one run-time parameter is less than or equal to the size of the constant memory, where the first shader program or the at least one second shader program is executed based on whether the at least one run-time parameter is calculated to be less than or equal to the size of the constant memory. The apparatus may also execute the first shader program or the at least one second shader program based on whether the at least one run-time parameter is less than or equal to a size of the constant memory. Moreover, the apparatus may store the data in the system memory or the constant memory based on whether the at least one run-time parameter is less than or equal to the size of the constant memory. The apparatus may also load the data from the system memory to the constant memory if the data is stored in the system memory. Further, the apparatus may update or maintain a configuration of a shader processor or a streaming processor at a graphics processing unit (GPU) based on executing the first shader program or the at least one second shader program. The apparatus may also adjust the size of the constant memory based on whether the configuration of the shader processor or the streaming processor is updated or maintained.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
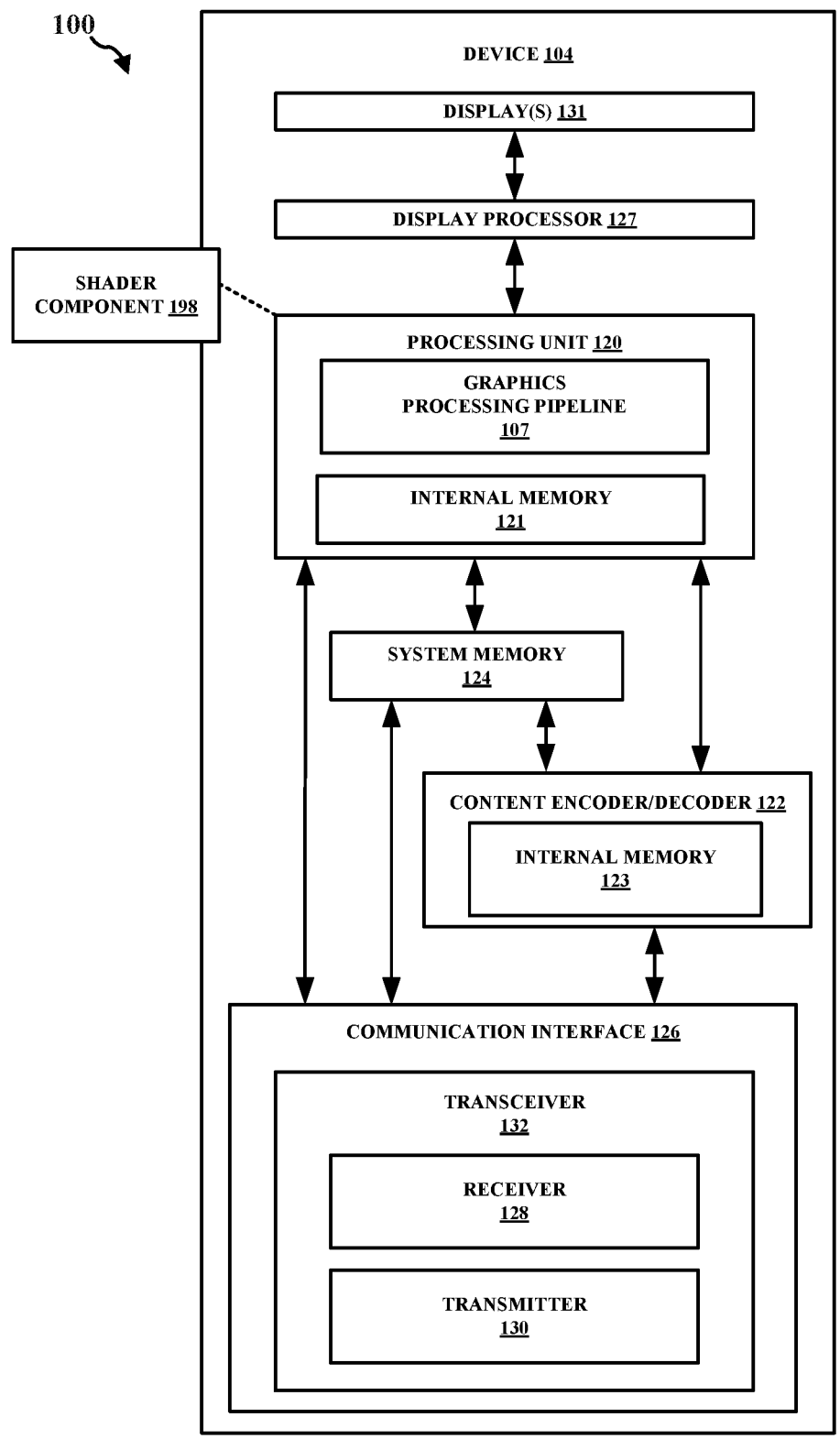
FIG. 1 is a block diagram that illustrates an example content generation system.

In aspects of graphics processing, a GPU may include a high level sequencer (HLSQ) block, which can prepare a context state for one or multiple streaming processors (SPs), such as a global register, shader constant, a buffer descriptor, an instruction, etc. Inside the HLSQ, there is an internal function unit called a state processor which is a single fiber scalar processor that executes a special shader program, called a preamble shader. The GPU compiler may generate the preamble shader in order to load constant data from different buffer objects and bind them into a single constant buffer, post process constant buffer, etc. In some instances, the HLSQ may execute a preamble shader once and skip a main shader which performs normal vertex shading or a fragment shading program. Additionally, a streaming processor (SP) may execute a preamble if the HLSQ decides to a skip preamble execution, as well as process a conventional graphics workload such as vertex shading or fragment shading. Further, after the compiler generates shader binary code from a high level shader language, the compiler may pass shader statistics to a GPU driver, such as a general purpose register (GPR) footprint, shader constant size, shader instruction size, etc. The SP may be based on the setting of these context registers to set up an SP internal resource configuration before executing a shader program. That is, the SP may use a GPR footprint to configure a GPR space partition, a constant ram size to configure a local buffer (LB) partition, and a shader size to configure an I-cache (I$) partition, so these state values may have a big impact on the SP execution performance and efficiency. If a high level program remains the same, larger values may result in a reduced performance. Also, because the GPR, LB and I$ are shared by multiple shaders, an efficient shader may have a positive impact on other workloads, and vice versa. In some aspects, when a compiler compiles a high level program from an application, it may not always generate an optimal shader due to some information that is not available at compile time, but available at a workload dispatch time (aka run-time or run time). For instance, some applications may define a variable size dynamic constant buffer, as the constant buffer size is unknown at compile time, so the compiler may use an instruction to load values from this variable size constant buffer to the GPR, and then execute a program sequence. Additionally, if the compiler is aware that the variable size constant buffer size is small enough to fit into the SP constant memory (e.g., constant random access memory (RAM)), then the compiler may generate an optimal program sequence. Compared with the aforementioned first sequence, the second sequence may use less GPR space, less arithmetic logic unit (ALU) instructions, and/or eliminate a constant load per-fiber. As such, the second sequence may be more power efficient and performant compared to the first sequence. In some examples, an application may use a portion of a large constant buffer, such that the entire buffer may exceed the available space at an SP constant memory (e.g., constant RAM). However, the actual size of the constant data used may not fit in the available space in the constant memory (e.g., constant RAM). Further, the constant data or information may just be available at a single time instance (e.g., a workload dispatch time). Aspects of the present disclosure may determine a size of constant data or information that is stored in constant memory. In some instances, aspects presented herein may adjust a size of constant memory based on the size of constant data or information that is stored in the constant memory. Further, aspects of the present disclosure may configure an availability of constant memory, such that the constant data or information may be available for storage in the constant memory at difference time periods. For instance, aspects of the present disclosure may determine a size of a variable dynamic constant buffer at different time periods. By doing so, aspects of the present disclosure may store constant data or information of different sizes at a variable dynamic constant buffer at different time periods.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a shader component 198 configured to receive a set of draw call instructions corresponding to a graphics workload, where the set of draw call instructions is associated with at least one run-time parameter corresponding to information available at a run-time for the graphics workload. The shader component 198 may also be configured to detect whether an index value (i) is less than the at least one run-time parameter; and increment the index value (i) if the index value (i) is less than the at least one run-time parameter. The shader component 198 may also be configured to obtain a first shader program associated with storing data in a system memory and at least one second shader program associated with storing the data in a constant memory. The shader component 198 may also be configured to calculate whether the at least one run-time parameter is less than or equal to the size of the constant memory, where the first shader program or the at least one second shader program is executed based on whether the at least one run-time parameter is calculated to be less than or equal to the size of the constant memory. The shader component 198 may also be configured to execute the first shader program or the at least one second shader program based on whether the at least one run-time parameter is less than or equal to a size of the constant memory. The shader component 198 may also be configured to store the data in the system memory or the constant memory based on whether the at least one run-time parameter is less than or equal to the size of the constant memory.

The shader component 198 may also be configured to load the data from the system memory to the constant memory if the data is stored in the system memory. The shader component 198 may also be configured to update or maintain a configuration of a shader processor or a streaming processor at a graphics processing unit (GPU) based on executing the first shader program or the at least one second shader program. The shader component 198 may also be configured to adjust the size of the constant memory based on whether the configuration of the shader processor or the streaming processor is updated or maintained. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
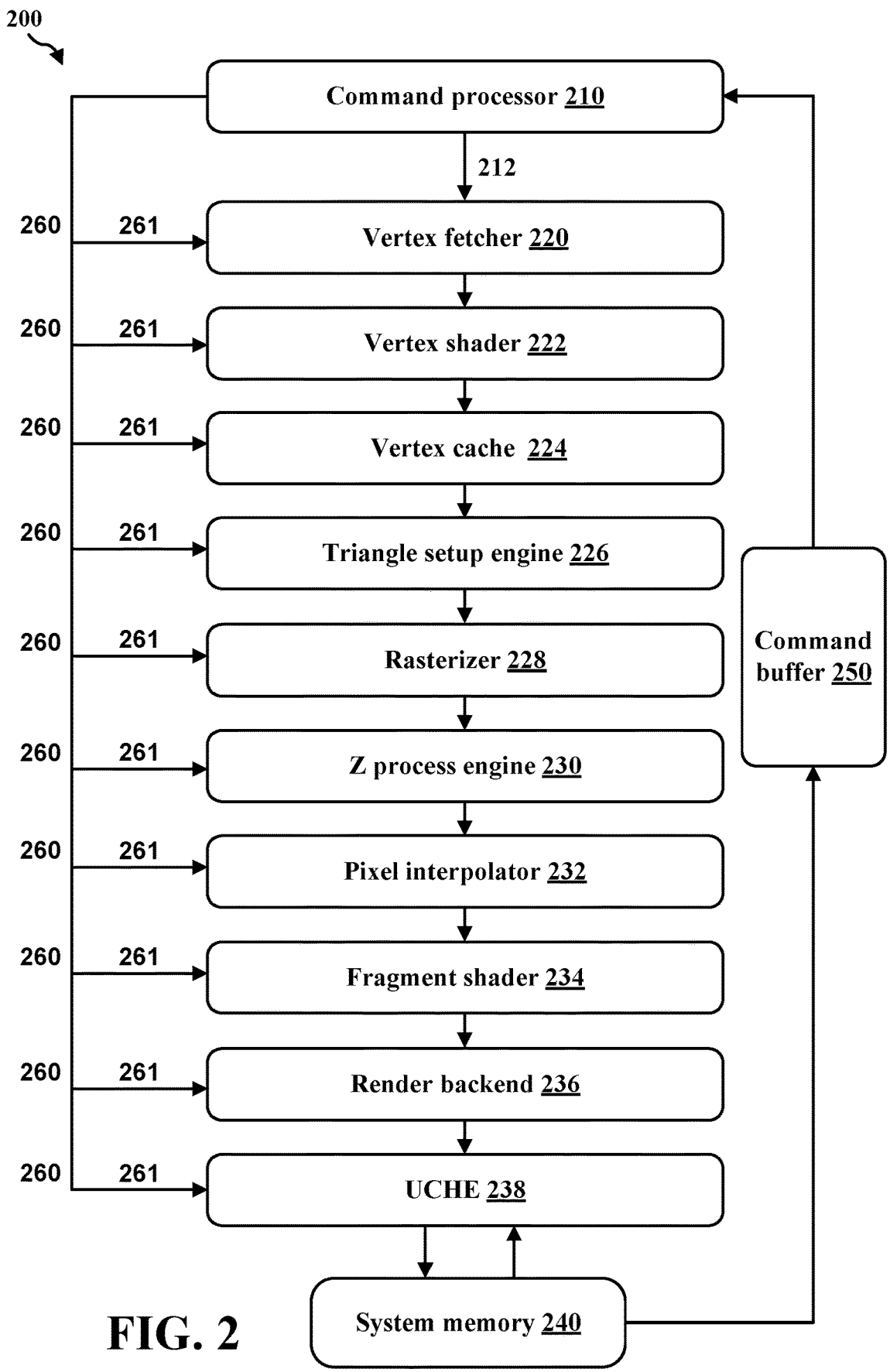
FIG. 2 is an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Figure 3:
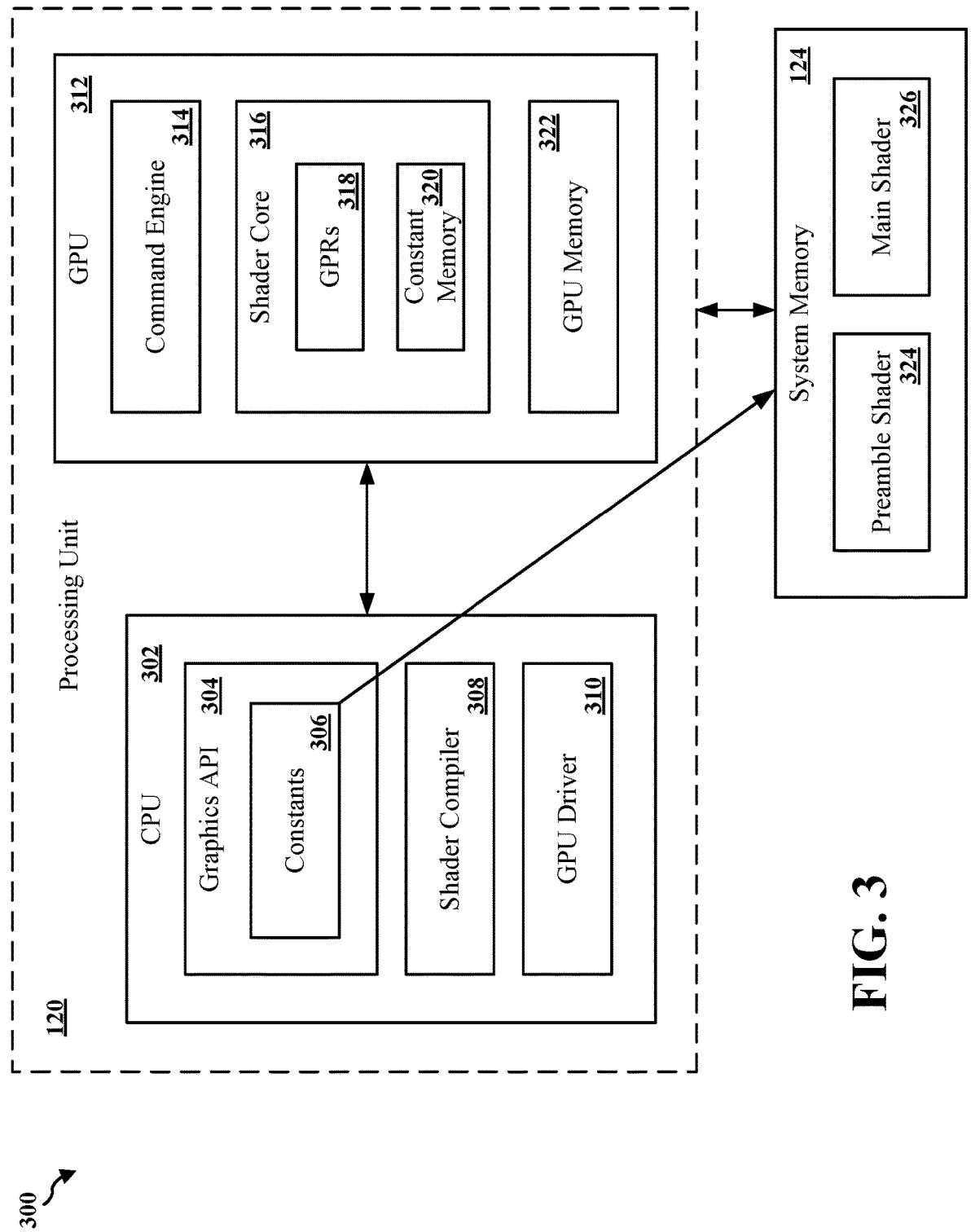
FIG. 3 is a diagram illustrating example components for processing data.

FIG. 3 is a diagram 300 that illustrates exemplary components, such as the processing unit 120 and the system memory 124, as may be identified in connection with the device 104 for processing data. In aspects, the processing unit 120 may include a CPU 302 and a GPU 312. The GPU 312 and the CPU 302 may be formed as an integrated circuit (e.g., a SOC) and/or the GPU 312 may be incorporated onto a motherboard with the CPU 302. Alternatively, the CPU 302 and the GPU 312 may be configured as distinct processing units that are communicatively coupled to each other. For example, the GPU 312 may be incorporated on a graphics card that is installed in a port of the motherboard that includes the CPU 302.

The CPU 302 may be configured to execute a software application that causes graphical content to be displayed (e.g., on the display(s) 131 of the device 104) based on one or more operations of the GPU 312. The software application may issue instructions to a graphics application program interface (API) 304, which may be a runtime program that translates instructions received from the software application into a format that is readable by a GPU driver 310. After receiving instructions from the software application via the graphics API 304, the GPU driver 310 may control an operation of the GPU 312 based on the instructions. For example, the GPU driver 310 may generate one or more command streams that are placed into the system memory 124, where the GPU 312 is instructed to execute the command streams (e.g., via one or more system calls). A command engine 314 included in the GPU 312 is configured to retrieve the one or more commands stored in the command streams. The command engine 314 may provide commands from the command stream for execution by the GPU 312. The command engine 314 may be hardware of the GPU 312, software/firmware executing on the GPU 312, or a combination thereof. While the GPU driver 310 is configured to implement the graphics API 304, the GPU driver 310 is not limited to being configured in accordance with any particular API. The system memory 124 may store the code for the GPU driver 310, which the CPU 302 may retrieve for execution. In examples, the GPU driver 310 may be configured to allow communication between the CPU 302 and the GPU 312, such as when the CPU 302 offloads graphics or non-graphics processing tasks to the GPU 312 via the GPU driver 310.

The system memory 124 may further store source code for one or more of a preamble shader 324 or a main shader 326. In such configurations, a shader compiler 308 executing on the CPU 302 may compile the source code of the shaders 324-326 to create object code or intermediate code executable by a shader core 316 of the GPU 312 during runtime (e.g., at the time when the shaders 324-326 are to be executed on the shader core 316). In some examples, the shader compiler 308 may pre-compile the shaders 324-326 and store the object code or intermediate code of the shader programs in the system memory 124. The shader compiler 308 (or in another example the GPU driver 310) executing on the CPU 302 may build a shader program with multiple components including the preamble shader 324 and the main shader 326. The main shader 326 may correspond to a portion or the entirety of the shader program that does not include the preamble shader 324. The shader compiler 308 may receive instructions to compile the shader(s) 324-326 from a program executing on the CPU 302. The shader compiler 308 may also identify constant load instructions and common operations in the shader program for including the common operations within the preamble shader 324 (rather than the main shader 326). The shader compiler 308 may identify such common instructions, for example, based on (presently undetermined) constants 306 to be included in the common instructions. The constants 306 may be defined within the graphics API 304 to be constant across an entire draw call. The shader compiler 308 may utilize instructions such as a preamble shader start to indicate a beginning of the preamble shader 324 and a preamble shader end to indicate an end of the preamble shader 324. Similar instructions may be used for the main shader 326.

The shader core 316 included in the GPU 312 may include GPRs 318 and constant memory 320. The GPRs 318 may correspond to a single GPR, a GPR file, and/or a GPR bank. Each GPR in the GPRs 318 may store data accessible to a single thread. The software and/or firmware executing on GPU 312 may be a shader program 324-326, which may execute on the shader core 316 of GPU 312. The shader core 316 may be configured to execute many instances of the same instructions of the same shader program in parallel. For example, the shader core 316 may execute the main shader 326 for each pixel that defines a given shape. The shader core 316 may transmit and receive data from applications executing on the CPU 302. In examples, constants 306 used for execution of the shaders 324-326 may be stored in a constant memory 320 (e.g., a read/write constant RAM) or the GPRs 318. The shader core 316 may load the constants 306 into the constant memory 320. In further examples, execution of the preamble shader 324 may cause a constant value or a set of constant values to be stored in on-chip memory such as the constant memory 320 (e.g., constant RAM), the GPU memory 322, or the system memory 124. The constant memory 320 may include memory accessible by all aspects of the shader core 316 rather than just a particular portion reserved for a particular thread such as values held in the GPRs 318.

Figure 4:
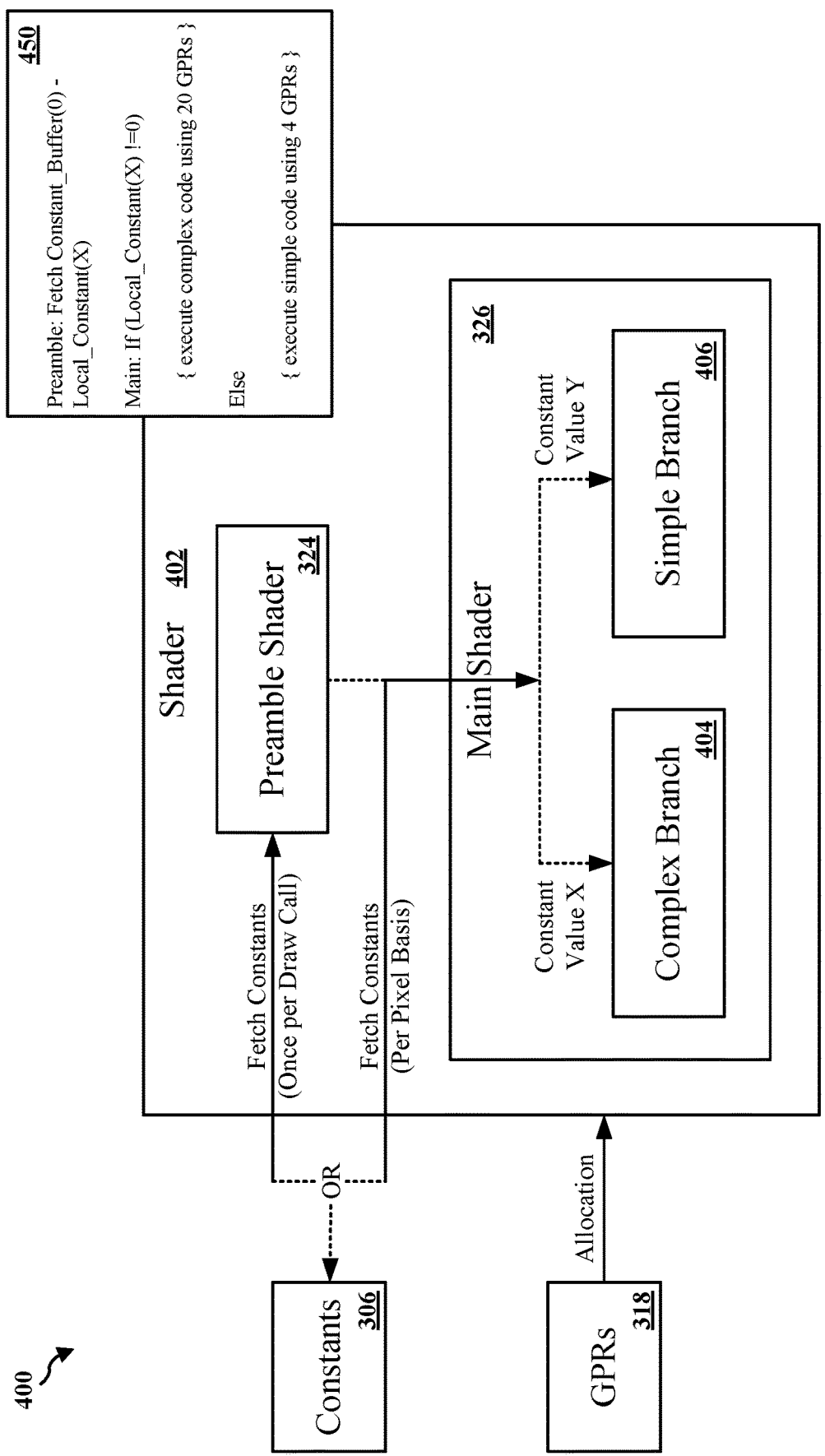
FIG. 4 is a diagram illustrating example instructions for executing a shader.

FIG. 4 is a block diagram 400 corresponding to example instructions 450 for executing a shader 402 based on a GPR allocation. GPRs may be variably allocated to shaders at a time of shader compilation. However, as a number of GPRs 318 allocated to the shader 402 increases, a corresponding number of threads that can be simultaneously resident in the GPU decreases. Such an effect caused by an increase in the number of allocated GPRs 318 may not just limit latency hiding but may also decrease an overall performance of the GPU. To balance the tradeoff between increasing the number of GPRs 318 allocated to the shader 402 and increasing the number of threads that can be simultaneously resident in the GPU, the shader 402 may be executed based on a minimum number of GPRs 318 for shader execution so that there are no unused allocated GPR resources by the shader 402.

The minimum number of GPRs 318 to execute the shader 402 may be based on constant/uniform values that do not change over the runtime of the shader 402 for a single draw call or kernel. Given that an exact value of the constants 306 may not be known by the compiler at the time the shader 402 is compiled, an overabundance of GPRs 318 may be allocated to the shader 402 to ensure sufficient availability of GPRs 318 for executing more complex paths/branches (e.g., the complex branch 404) of the shader 402. If the value of the constants 306 were known at the time the shader 402 is compiled, the compiler may be able to increase shader performance by eliminating certain branches from the shader 402 that utilize more GPRs 318 for execution and thereby reduce the number of GPRs 318 to be allocated to the shader 402 following compilation. Alternatively, if the GPU driver could determine the value of the constants 306 at the time the shader 402 is submitted (e.g., queued) to the GPU, the compiler could generate multiple versions of the shader 402 that each have a different GPR allocation and allow the GPU driver to select the version of the shader 402 that is to be used at submittal time.

In general, the values of constants 306 may not be determined by the compiler at compile time or by the GPU driver at submittal time. While the shader 402 may be configured to identify the values of the constants 306 at runtime, the number of GPRs 318 may already be allocated to the shader 402 by the time that runtime occurs, perhaps in excess of the number of GPRs 318 for executing certain branches of the shader 402. Thus, even though the compiler may be configured to identify that a variable is a constant at compile time, the exact value of that constant 306 may remain unknown during shader compilation such that the constant value cannot be used for reducing the GPR allocation. A shader may have different flow control paths/branches that are based on some combination of the constants 306. The constants 306 may be defined within the graphics API to remain the same across the entire draw call (e.g., for the entire life of a corresponding shape). That is, a constant 306 of a given value does not change on a per pixel basis from one pixel to the next across the draw call. The constant 306 remains unchanged throughout the shader lifetime for all of the pixels that execute the corresponding shape. Constant buffers, which may also be referred to as uniform buffers, may be managed by the graphics API and reside in memory (e.g., similar to a texture buffer or a frame buffer), where the constant buffers may be accessed by the shader 402 to provide constant/uniform values over the draw call.

An executable shader program may include a preamble portion of the shader program and a main portion of the shader program (or simply a "preamble shader" 324 and a "main shader" 326). The preamble shader 324 may be a portion of the shader 402 that is executed just once per draw call or kernel. The preamble shader 324 may be executed prior to allowing any threads to execute the main shader 326. The preamble shader 324 may also preload constant values into a local memory of the GPU where the constant values may be used by multiple threads executing within the main shader 326. Accordingly, the constant values may be fetched by the preamble shader once per draw call, rather than being fetched by the main shader for each thread (e.g., pixel) within the draw call. In an example, the preamble shader 324 may fetch a constant 306 from the local constant buffer. In some aspects, the constants 306 or the contents of the constant buffer may be stored in system memory 124. When the constant 306 has a first value (e.g., constant value X), the main shader 326 may execute a complex branch 404 using a first number of GPRs 318 (e.g., 20 GPRs). When the local constant has a second value (e.g., constant value Y), the main shader 326 may execute a simple branch 406 using a second number of GPRs 318 (e.g., 4 GPRs). However, in cases where the local constant is 0 for the draw call and execution of the complex branch 404 may not be needed, the shader 402 may still be executed, for example, based on an allocation of 20 GPRs rather than based on an allocation of 4 GPRs. As a result, some of the GPRs 318 allocated to the shader 402 may be unnecessary/excessive.

Figure 5:
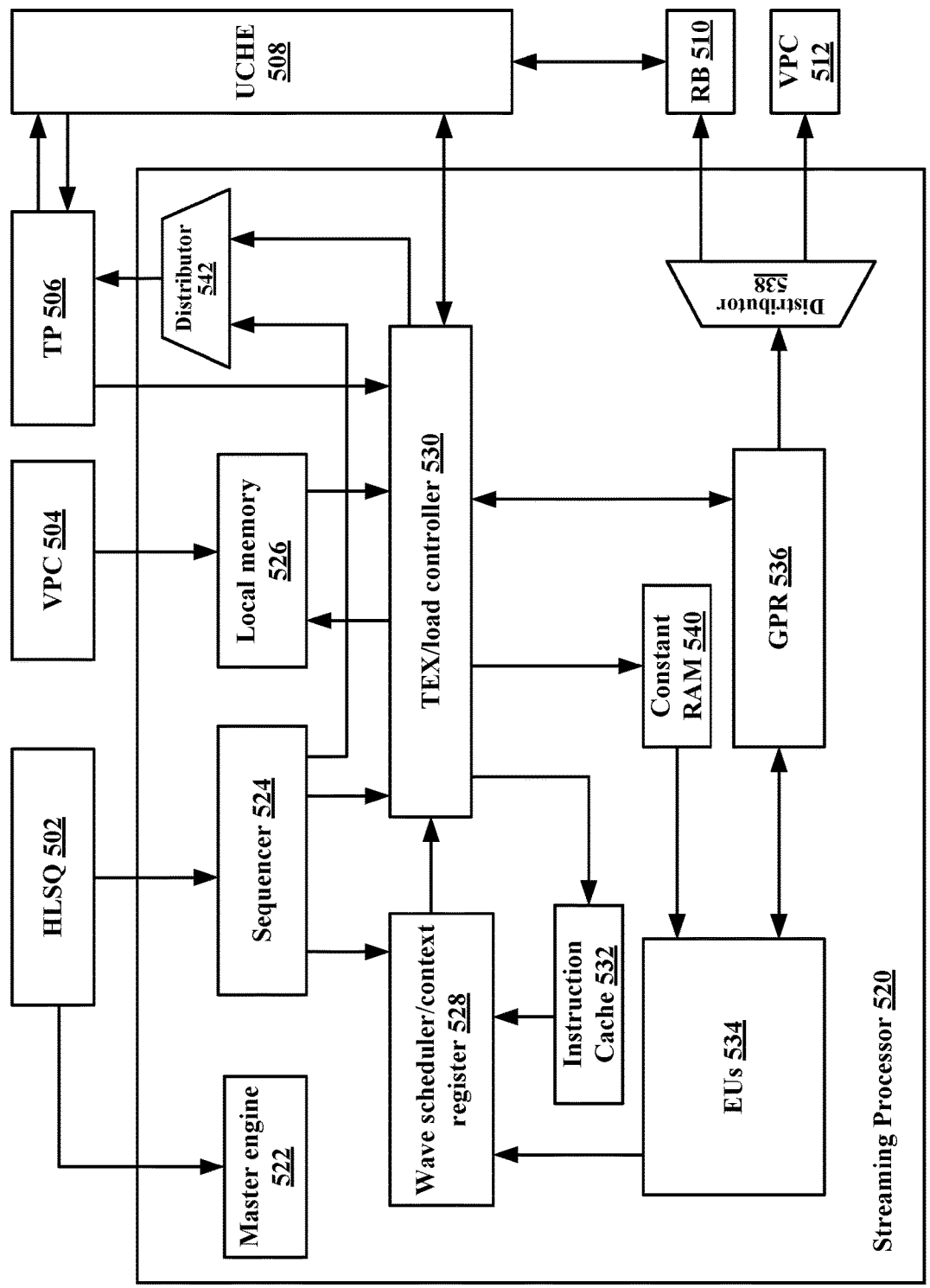
FIG. 5 is diagram illustrating an example GPU.

FIG. 5 illustrates an example GPU 500. More specifically, FIG. 5 illustrates a streaming processor (SP) system in GPU 500. As shown in FIG. 5, GPU 500 includes high level sequencer (HLSQ) 502, VPC 504, texture processor (TP) 506, UCHE 508, RB 510, and VPC 512. GPU 500 also includes SP 520, master engine 522, sequencer 524, local memory 526, wave scheduler and context register 528, texture (TEX) or load controller 530, instruction cache 532, execution units (EUs) 534, general purpose register (GPR) 536, output distributor 538, constant RAM 540, and texture distributor 542. The wave scheduler and context register 528 may include one or more wave slots.

As shown in FIG. 5, the SP 520 may include traditional function units or blocks, e.g., EUs 534 or sequencer 524. EUs 534 may execute or process some of the desired functions of the GPU. The sequencer 524 may allocate resources and local memory. Also, the sequencer 524 may allocate wave slots and any associated GPR 536 space. For example, the sequencer 524 may allocate wave slots or GPR 536 space when the HLSQ 502 issues a pixel tile workload to the SP 520. In some aspects, the wave scheduler and context register 528 may execute a pixel shader or issue instructions to the EUs 534. The EUs 534 may also include an arithmetic logic unit (ALU) and/or an elementary function unit (EFU). Further, the TEX or load controller 530 may be considered an execution unit. Moreover, the TEX or load controller 530 may correspond to one or more units. For instance, the TEX may perform a texture fetch and/or the load controller may perform a memory fetch. In some aspects, the instruction cache 532 may store a program to be executed. Also, the constant RAM 540 may store the constant that may be needed for a constant or uniform formation. As further shown in FIG. 5, the SP 520 may interface with the outside blocks, e.g., HLSQ 502, VPC 504, TP 506, UCHE 508, RB 510, and VPC 512. These blocks 502-512 may utilize user provided input and/or the SP may output results to these blocks or memory access.

As shown in FIG. 5, each unit or block in GPU 500 may send data or information to other blocks. For instance, HLSQ 502 may send commands to the master engine 522.

Also, HLSQ 502 may send vertex threads, vertex attributes, pixel threads, and/or pixel attributes to the sequencer 524. VPC 504 may send certain coefficients to local memory 526. TP 506 may send texture data to the TEX or load controller 530. TP 506 may also receive texture requests from TEX or load controller 530, e.g., via texture distributor 542, and bypass requests from local memory 526. Further, TP 506 may send requests to and receive texture elements (texels) from UCHE 508. UCHE 508 may also send memory data to and receive a memory request from TEX or load controller 530, as well as send memory data to and receive a memory request from RB 510. Also, RB 510 may receive an output in the form of color from GPR 536, e.g., via output distributor 538. VPC 512 may also receive output in the form of vertices from GPR 536, e.g., via output distributor 538. GPR 536 may also send temporary data to and receive temporary data from EUs 534. Moreover, EUs 534 may send address or predicate information to the wave scheduler and context register 528, as well as receive constant data from constant RAM 540. TEX or load controller 530 may also send/receive load or store data to/from GPR 536, as well as send store data to, and receive load data from, local memory 526. Further, TEX or load controller 530 may send global data to constant RAM 540 and update information to the instruction cache 532. TEX or load controller 530 may also receive attribute data from sequencer 524 and synchronization information from wave scheduler and context register 528. Additionally, wave scheduler and context register 528 may receive decode information from instruction cache 532 and thread data from sequencer 524.

Figure 6:
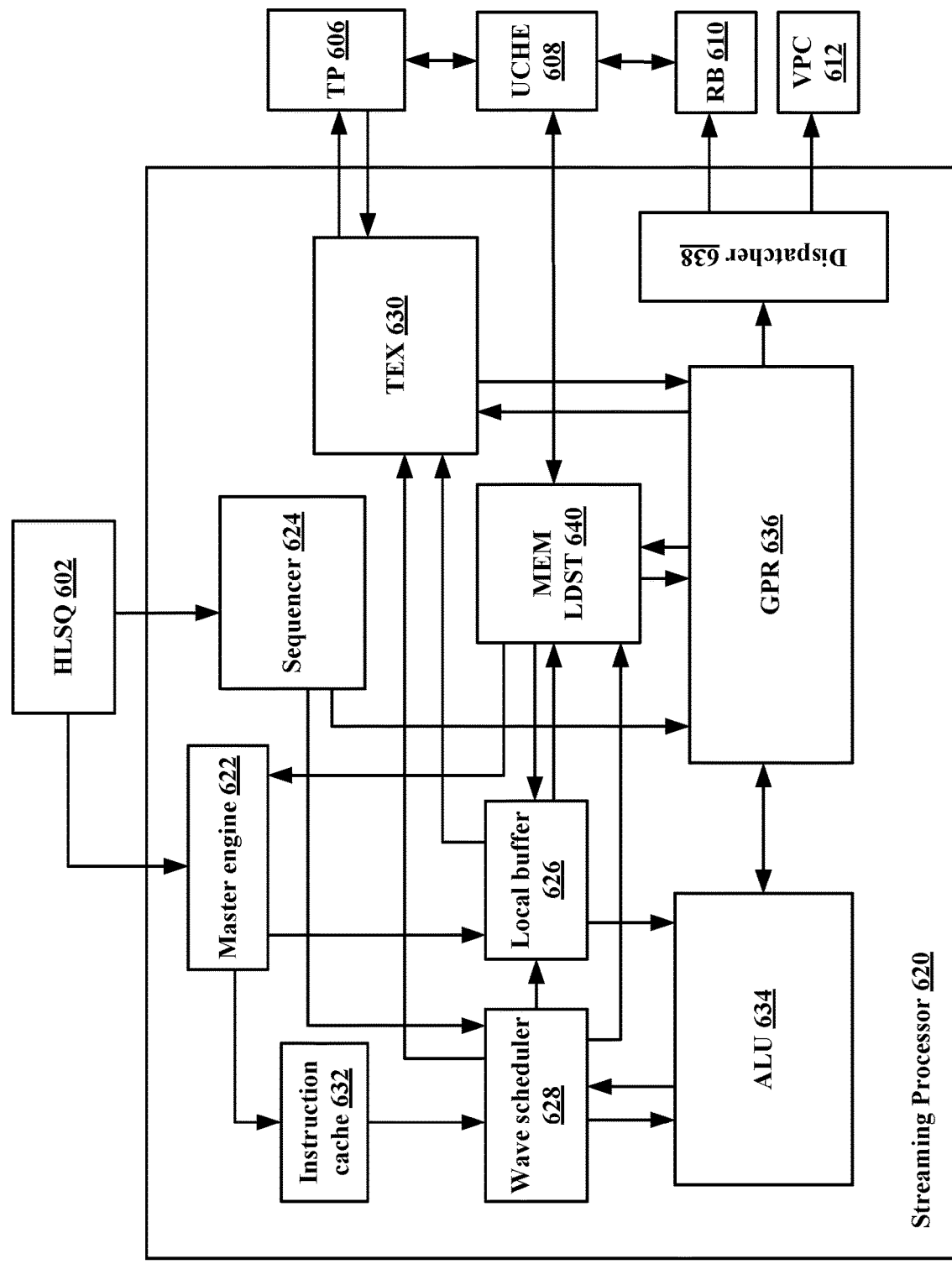
FIG. 6 is a diagram illustrating an example GPU.

FIG. 6 illustrates an example GPU 600. As shown in FIG. 6, GPU 600 is similar to GPU 500 in FIG. 5, but GPU 600 includes a few different components. More specifically, FIG. 6 illustrates a streaming processor (SP) system in GPU 600. As shown in FIG. 6, GPU 600 includes HLSQ 602, TP 606, UCHE 608, RB 610, and VPC 612. GPU 600 also includes SP 620, master engine 622, sequencer 624, local buffer 626, wave scheduler 628, texture (TEX) 630, instruction cache 632, ALU 634, GPR 636, dispatcher 638, and memory (MEM) load store (LDST) 640.

As shown in FIG. 6, each unit or block in GPU 600 may send data or information to other blocks. For instance, HLSQ 602 may send commands to the master engine 622. Also, HLSQ 602 may send vertex threads, vertex attributes, pixel threads, pixel attributes, and/or compute commands to the sequencer 624. TP 606 may receive texture requests from TEX 630, and send texture elements (texels) back to the TEX 630. Further, TP 606 may send memory read requests to and receive memory data from UCHE 608. UCHE 608 may also receive memory read or write requests from MEM LDST 640 and send memory data back to MEM LDST 640, as well as receive memory read or write requests from RB 610 and send memory data back to RB 610. Also, RB 610 may receive an output in the form of color from GPR 636, e.g., via dispatcher 638. VPC 612 may also receive output in the form of vertices from GPR 636, e.g., via dispatcher 638. GPR 636 may send address data or receive write back data from MEM LDST 640. GPR 636 may also send temporary data to and receive temporary data from ALU 634. Moreover, ALU 634 may send address or predicate information to the wave scheduler 628, as well as receive instructions from wave scheduler 628. Local buffer 626 may send constant data to ALU 634. TEX 630 may also receive texture attributes from or send texture data to GPR 636, as well as receive constant data from local buffer 626. Further, TEX 630 may receive texture requests from wave scheduler 628, as well as receive constant data from local buffer 626. MEM LDST 640 may send/receive constant data to/from local buffer 626. Sequencer 624 may send wave data to wave scheduler 628, as well as send data to GPR 636. Master engine 622 may send program data to instruction cache 632, as well as send constant data to local buffer 626 and receive instructions from MEM LDST 640. Instruction cache 632 may send instructions or decode information to wave scheduler 628. Wave scheduler 628 may send read requests to local buffer 626, as well as send memory requests to MEM LDST 640.

As further shown in FIG. 6, the high level sequencer (HLSQ) 602 may prepare one or more context states for the streaming processor (SP) 620. For example, the HLSQ 602 may prepare the context states for different types of data, e.g., global register data, shader constant data, buffer descriptors, instructions, etc. Additionally, the HLSQ 602 may embed context states into a command stream to the SP 620. The master engine 622 may parse the command stream from the HLSQ 602 and setup an SP global state.

Moreover, the master engine 622 may fill or add to an instruction cache 632 and/or a local buffer 626 or a constant buffer. In some aspects, inside the HLSQ 602, there may be an internal function unit called a state processor. The state processor may be a single fiber scalar processor that may execute a special shader program, e.g., a preamble shader. The preamble shader may be generated by the GPU compiler in order to load constant data from different buffer objects. Also, the preamble shader may bind the buffer objects into a single constant buffer, such as a post-process constant buffer. Further, the HLSQ 602 may execute the preamble shader and, as a result, skip utilizing a main shader. In some instances, the main shader may perform different shading tasks, such as normal vertex shading and/or a fragment shading program.

Additionally, as shown in FIG. 6, the SP 620 may not be limited to executing a preamble if the HLSQ 602 decides to skip a preamble execution. For instance, the SP 620 may also process a conventional graphics workload, such as vertex shading and/or fragment shading. In some aspects, the SP 620 may utilize its execution units and storage in order to process compute tasks as a general purpose GPU (GPGPU). Inside the SP 620, there may be multiple parallel instruction execution units such as an ALU, EFU, branching unit, TEX, general memory read and write (aka LDST), etc. The SP 620 may also include on-chip storage memory, such as a general purpose register (GPR) 636 which may store per-fiber private data. Also, the SP 620 may include a local buffer 626 which stores per-shader or per-kernel constant data, per-wave uniform data (aka uGPR), and per-compute work group (WG) local memory (LM). Moreover, as shown in FIG. 6, dispatcher 638 may fetch data from GPR 636. Dispatcher 638 may also perform format conversion, and then dispatch a final color to multiple render targets (RTs). Each RT may have one or more components, such as red (r) green (G) blue (B) alpha (A) (RGBA) data, or just an alpha component of the RGBA data. Further, each RT may be generally stored in a vector GPR, i.e., R3.0 may store red data, R3.1 may store green data, R3.2 may store blue data, etc. Also, a driver program in an SP context register may be utilized to define the GPR identifier (ID) which stores RT data.

As shown in FIG. 6 above, a GPU may include a high level sequencer (HLSQ) block, which can prepare a context state for one or multiple streaming processors (SPs), such as a global register, shader constant, a buffer descriptor, an instruction, etc. The HLSQ may also embed a context state into a command stream to the SP, where the SP master engine may parse the command stream from the HLSQ and set up an SP global state, as well as fill an instruction cache and a constant buffer. Inside the HLSQ, there is an internal function unit called a state processor which is a single fiber scalar processor that executes a special shader program, called a preamble shader. The GPU compiler may generate the preamble shader in order to load constant data from different buffer objects and bind them into a single constant buffer, post process constant buffer, etc. In some instances, the HLSQ may execute a preamble shader once and skip a main shader which performs normal vertex shading or a fragment shading program.

Additionally, as shown in FIG. 6 above, a streaming processor (SP) may execute a preamble if the HLSQ decides to a skip preamble execution, as well as process a conventional graphics workload such as vertex shading or fragment shading. The SP may utilize its execution units and storage to process a compute task as a general-purpose GPU (GPGPU). Inside the SP wave scheduler, there may be multiple parallel instruction execution units such as an arithmetic logic unit (ALU), an elementary function unit (EFU), a branching unit, a texture sample unit (TEX), a general memory read and write (aka a load store (LDST)), etc. There is also on-chip storage memory, such as a general purpose register (GPR) which stores per-fiber private data, a local buffer (LB) which stores per-shader or per-kernel constant data, per-wave uniform data (aka uGPR), and per-compute work group (WG) local memory (LM).

Further, after the compiler generates shader binary code from a high level shader language, the compiler may pass shader statistics to a GPU driver, such as a GPR footprint, shader constant size, shader instruction size, etc. Then the driver may parse the shader statistics information as a context register, and embed the information in the command stream. The GPU command processor (CP) block may decode the command stream and pass the context register to the HLSQ. The SP may be based on the setting of these context registers to set up an SP internal resource configuration before executing a shader program. That is, the SP may use a GPR footprint to configure a GPR space partition, a constant ram size to configure an LB partition, and a shader size to configure an I-cache (I$) partition, so these state values may have a big impact on the SP execution performance and efficiency. If a high level program remains the same, larger values may result in a reduced performance. Also, because the GPR, LB and I$ are shared by multiple shaders, an efficient shader may have a positive impact on other workloads, and vice versa.

In some aspects, when a compiler compiles a high level program from an application, it may not always generate an optimal shader due to some information that is not available at compile time, but available at a workload dispatch time (aka run-time or run time). For instance, some applications may define a variable size dynamic constant buffer, as the constant buffer size is unknown at compile time, so the compiler may use an LDC instruction to load values from this variable size constant buffer to the GPR, and then execute a program sequence. For example, the GPU may execute the following program sequence (i.e., a first sequence):

Iadd addr, buffer_base, offset //calculate constant value memory address "addr"

ldc r1, mem[addr]; //use ldc instruction to load constant to GPR r1

(sy) fmul.f32 r2, r0, r1 //fetch constant data from memory and write back to r1, then compute r2=r0*r1

Additionally, if the compiler is aware that the variable size constant buffer size is small enough to fit into the SP constant memory (e.g., constant random access memory (RAM)), then the compiler may generate an optimal program sequence. For example, the compiler may generate the following program sequence (i.e., a second sequence): fmul.f32 r1, r0, c100 (i.e., assume the corresponding constant value stored in c100). Compared with the aforementioned first sequence, the second sequence may use less GPR space, less ALU instructions, and/or eliminate a constant load per-fiber. As such, the second sequence may be more power efficient and performant compared to the first sequence.

In some examples, an application may use a portion of a large constant buffer, such that the entire buffer may exceed the available space at an SP constant memory (e.g., constant RAM). However, the actual size of the constant data used may fit in the available space in the constant memory (e.g., constant RAM). Further, the constant data or information may just be available at a single time instance (e.g., a workload dispatch time). Based on the above, it may be beneficial to determine a size of constant data or information that is stored in constant memory. Moreover, it may be beneficial for the constant data or information to be available for storage at difference time periods. Accordingly, it may be beneficial to determine a size of a variable dynamic constant buffer at different time periods.

Aspects of the present disclosure may determine a size of constant data or information that is stored in constant memory. In some instances, aspects presented herein may adjust a size of constant memory based on the size of constant data or information that is stored in the constant memory. Further, aspects of the present disclosure may configure an availability of constant memory, such that the constant data or information may be available for storage in the constant memory at difference time periods. For instance, aspects of the present disclosure may determine a size of a variable dynamic constant buffer at different time periods. By doing so, aspects of the present disclosure may store constant data or information of different sizes at a variable dynamic constant buffer at different time periods.

In some instances, aspects of the present disclosure may determine a size of a variable dynamic constant buffer at a specific time, such as when the HLSQ or SP executes a preamble. For instance, some information may not be available at compile time, but may be available at a later time. For example, some information that is missing at compile time may become available at a workload dispatch time. Accordingly, this may create an optimization opportunity for storing this missing information in constant memory at another time (e.g., the time when the HLSQ or SP executes the preamble). That is, aspects presented herein may inspect the actual size of a variable dynamic constant buffer and promote the portion of information to constant memory (e.g., constant RAM) at a certain time (e.g., the time when the HLSQ or SP executes the preamble).

Some aspects of the present disclosure may utilize a flow to optimize the shader execution at the GPU. In order to do so, in some examples, an application may declare a large constant buffer that exceeds a size of constant memory (e.g., a constant RAM size). For example, this may be accomplished by the following code: Declare (Dcl) CB0[4096] (i.e., the application declares a large constant buffer that exceeds a constant RAM size). Further, a constant buffer parameter (i.e., CB_parameter) may be a constant parameter available at a certain time (e.g., a workload dispatch time). In some instances, if an index value (i) is less than the constant buffer parameter, the index value (i) may be incremented, such that constant buffer data (e.g., CB0) may be stored at a constant buffer location based on the index value (i). This may be represented by the code below (e.g., a shader program), where the CB_parameter is a constant parameter available at a workload dispatch time (i.e., 16):

For (int i=0; i<CB_parameter; i++)
   Use CB0[i]

Also, in some instances, a compiler may generate multiple versions of a shader program. For instance, a compiler may generate a first version of a shader program (i.e., default version #0) and a second version of the shader program (i.e., optimized version #1). In the first version of the shader program, constant buffer data (e.g., CB0) may not be promoted to constant memory (e.g., constant RAM). Also, in the first version of the shader program, a main program may use a load from constant (LDC) instruction to load constant buffer data to the general purpose register (GPR). In a second version of the shader program, constant buffer data (e.g., CB0) may be promoted to constant memory (e.g., constant RAM). Moreover, in the second version of the shader program, a main program may use direct access constant memory, and thus eliminate the LDC instruction. For example, the aforementioned steps may be accomplished by the following code:

```
Default version #0:
  SHPS
    ...                //Do not promote CB0 to constant ram
  SHPE
  Main #0              //main program, use LDC to load CB0 data to GPR
Optimized version #1:
  SHPS
    ...
    Load CB0 to Cxxx   //promote CB0 data to constant ram
  SHPE
  Main #1   //main program, use C# direct access constant ram, eliminate LDC
```

Figure 7:
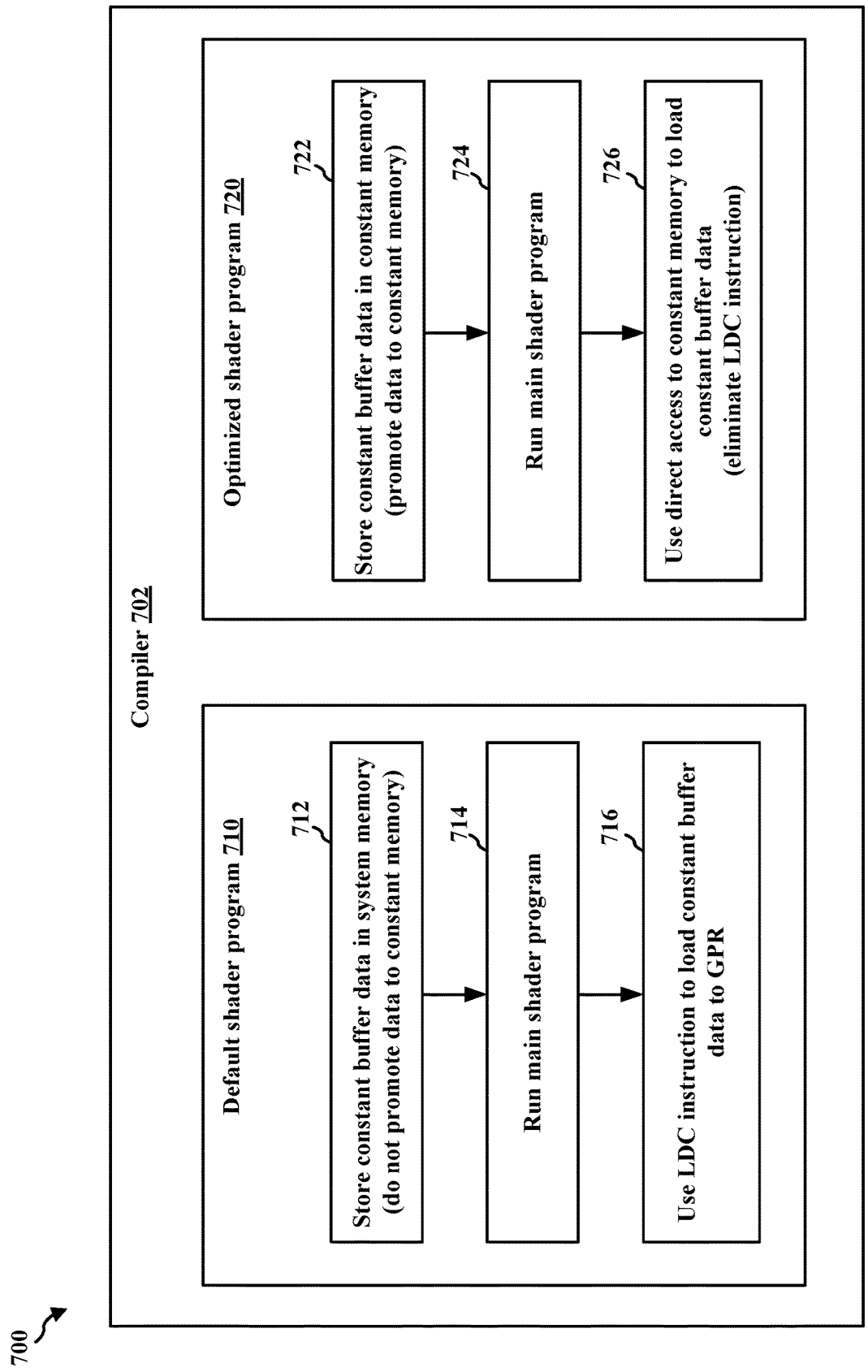
FIG. 7 is a diagram illustrating an example of shader programs generated by a compiler at a GPU.

FIG. 7 illustrates diagram 700 including an example of different shader programs generated by a compiler at a GPU. More specifically, diagram 700 in FIG. 7 shows default shader program 710 and optimized shader program 720 that are generated by compiler 702. As shown in FIG. 7, default shader program 710 includes step 712, step 714, and step 716. At step 712, default shader program 710 stores constant buffer (CB) data in system memory. That is, the constant buffer data is not promoted to constant memory. At step 714, default shader program 710 runs a main shader program. At step 716, default shader program 710 uses a load from constant (LDC) instruction to load the constant buffer data to a general purpose register (GPR). As further shown in FIG. 7, optimized shader program 720 includes step 722, step 724, and step 726. At step 722, optimized shader program 720 may store constant buffer data in constant memory. That is, the constant buffer data may be promoted to constant memory. At step 724, optimized shader program 720 may run a main shader program. At step 726, optimized shader program 720 may use direct access to the constant memory in order to load the constant buffer data. By doing so, optimized shader program 720 may eliminate the LDC instruction.

Additionally, a compiler may create a type of preamble (e.g., a preamble of a shader program) called a dispatch shader with new instructions for a set shader state (SSS) context register. For instance, the dispatch shader may initiate a dispatch shader start (DPSS) and obtain a constant buffer parameter from constant memory (e.g., constant RAM). The dispatch shader may then compare the constant buffer parameter to the constant memory size, and if the constant buffer parameter is less than or equal to the constant memory size, the dispatch shader may generate a predicate (P0). If the predicate (P0) is true, the dispatch shader may then generate a new SSS instruction to set a GPR footprint for an optimized version of the shader program (i.e., version #1), as well as generate a new SSS instruction to set a constant length (constantLength) for the optimized version. Also, if the predicate (P0) is true, the dispatch shader may set a shader code (ShaderCode) descriptor. For example, the dispatch shader may generate a new SSS instruction to set a certain shader size (e.g., a version #1 shader size), an address offset, etc., for an optimized version of the shader program. If the predicate (P0) is false, the dispatch shader may use a default version of the shader program (i.e., version #0). In the default version, the dispatch shader may set a GPR footprint (GPRfootprint) for the default version, as well as set a constant length (constantLength) for the default version. Further, in the default version, the context register may be set as optional, such as with a shader code descriptor. After this, the preamble or dispatch shader may end (e.g., a dispatch shader end (DPSE)). In some instances, the aforementioned steps may be accomplished by the following code:

(constantLength) for the default preamble. Further, at step 814, default preamble 810 may set a shader code (ShaderCode) descriptor for the default preamble. At step 816, default preamble 810 may end the default preamble.

Figure 8:
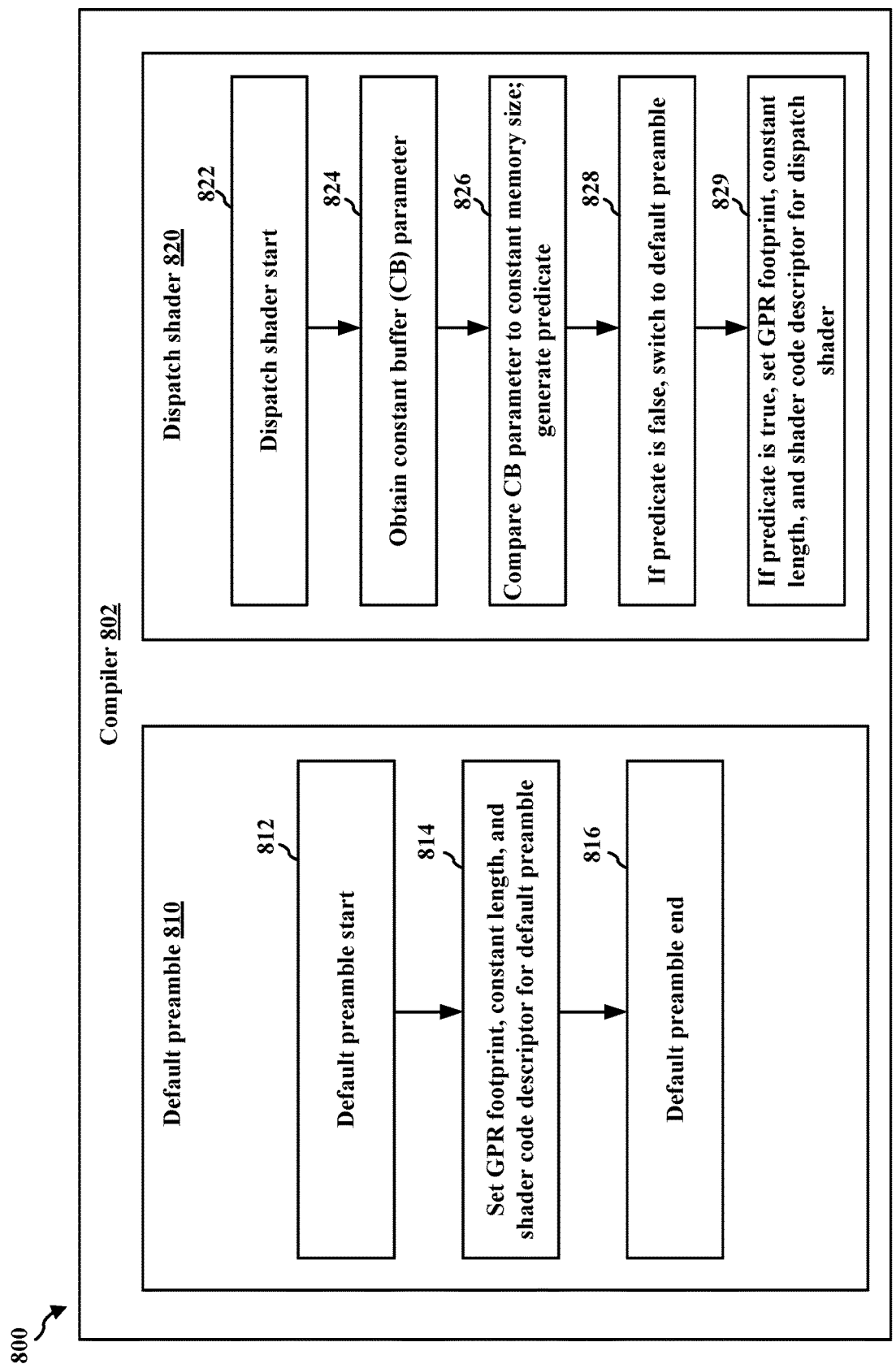
FIG. 8 is a diagram illustrating an example of shader preambles generated by a compiler at a GPU.

As further shown in FIG. 8, dispatch shader 820 includes step 822, step 824, step 826, step 828, and step 829. The dispatch shader 820 may be a preamble (e.g., a preamble of a shader program) with updated instructions for a set shader state (SSS) context register. At step 822, dispatch shader 820 may start a dispatch shader. At step 824, dispatch shader 820 may obtain a constant buffer (CB) parameter. At step 826, dispatch shader 820 may compare the CB parameter to a size of a constant memory. Further, at step 826, dispatch shader 820 may generate a predicate (P0). If the predicate is false, at step 828, dispatch shader 820 may switch to a default preamble (e.g., default preamble 810). If the predicate is true, at step 829, dispatch shader 820 may set a GPR footprint (GPRfootprint) for the dispatch shader. Also, at step 829, dispatch shader 820 may set a constant length (constantLength) for the dispatch shader. Further, at step 829, dispatch shader 820 may set a shader code (ShaderCode) descriptor for the dispatch shader. After this, dispatch shader 820 may jump to a preamble end step that ends the dispatch shader.

In some aspects of the present disclosure, on a hardware side of the GPU, a high level sequencer (HLSQ), streaming processor (SP), or shader processor may include a number of functionalities. For example, the HLSQ, SP, or shader processor may recognize the dispatch shader. After recognizing the dispatch shader, the HLSQ, SP, or shader processor may load and dispatch a corresponding shader version. The HLSQ, SP, or shader processor may also decode a set shader state (SSS) instruction. By decoding the SSS instruction, the HLSQ, SP, or shader processor may update the drawcall or kernel context register, such as a GPR footprint, a constant size, etc.

Further, in some instances, the GPU hardware may send the collected feedback information (i.e., a loop count that

```
Dispatch Shader:
  DPSS                              //dispatch shader start
  Load cb or other info;            //get CB_parameter, i.e., from Constant RAM
  P0 = calculate( )                   //compare CB parameter <= constant ram size,
                                      generate predicate P0
  Branch !P0, default               // if predicate P0 is false, use default version
  SET GPRfootprint for version #1      //New SSS instruction to set GPR footprint
  SET constantLength for version #1       //New SSS instruction to set
constantLength
  SET shaderCode descriptor for version #1   //New SSS instruction to set version#1
                                      shader size, address offset etc.
  Jump PreambleEnd;
Default:
  SET GPRfootprint for version #0
  SET constantLength for version #0
  SET ShaderCode descriptor for version #0   //default version set context register
                                      is optional
PreambleEnd:
  DPSE                              //dispatch shader end
```

FIG. 8 illustrates diagram 800 including an example of different shader preambles generated by a compiler at a GPU. More specifically, diagram 800 in FIG. 8 shows default preamble 810 and dispatch shader 820 that are generated by compiler 802. As shown in FIG. 8, default preamble 810 includes step 812, step 814, and step 816. At step 812, default preamble 810 may start the default preamble. At step 814, default preamble 810 may set a GPR footprint (GPRfootprint) for the default preamble. Also, at step 814, default preamble 810 may set a constant length determines a constant ram size, a dispatched shader version, etc.) to a driver-allocated system memory at run-time. The driver may then collect the feedback information to perform a deeper optimization. For instance, the driver may recompile the shader with collected run-time information to create a more efficient shader version. For example, the driver may unroll the loop with a sample or load instruction inside the loop to form a larger sample or a load instruction group to reduce memory fetch latency. Further, the driver may add new shader versions or eliminate irrelevant shader versions in order to reduce the compile time.

Additionally, by utilizing a new SSS instruction, aspects presented herein may eliminate the shader-related context register from driver programing. By doing so, the HLSQ, SP, or shader processor may decode the context register from the shader instruction directly when the HLSQ, SP, or shader processor executes the shader program. This process may reduce the transition overhead between the compiler, the driver, and the command processor (CP) at the GPU. Moreover, an amount of the CP processing HLSQ SP state cycles may also be reduced.

Aspects of the present disclosure may include a number of benefits or advantages. For instance, aspects presented herein may provide an area efficient (i.e., the hardware area cost delta is close to zero), power efficient, and performant manner in which a compiler generates an optimal shader code. Aspects presented herein may accomplish this efficient manner by utilizing a run-time optimization mechanism including run-time available information to eliminate redundant instructions. Aspects of the present disclosure may also reduce a GPR footprint by utilizing a run-time optimization mechanism. Further, aspects presented herein may eliminate a redundant memory load in a main program on a per-pixel/per-fiber invocation by utilizing a run-time optimization mechanism. By utilizing the aforementioned run-time optimization mechanism, there may be an uplift in frames-per-second (FPS) (e.g., a 14% FPS uplift). Moreover, by utilizing the aforementioned run-time optimization mechanism, there may be an SP constant load reduction (e.g., a 90% SP constant load reduction potential) by optimizing a single shader (e.g., a single shader in a forwardDraw1 surface).

Figure 9:
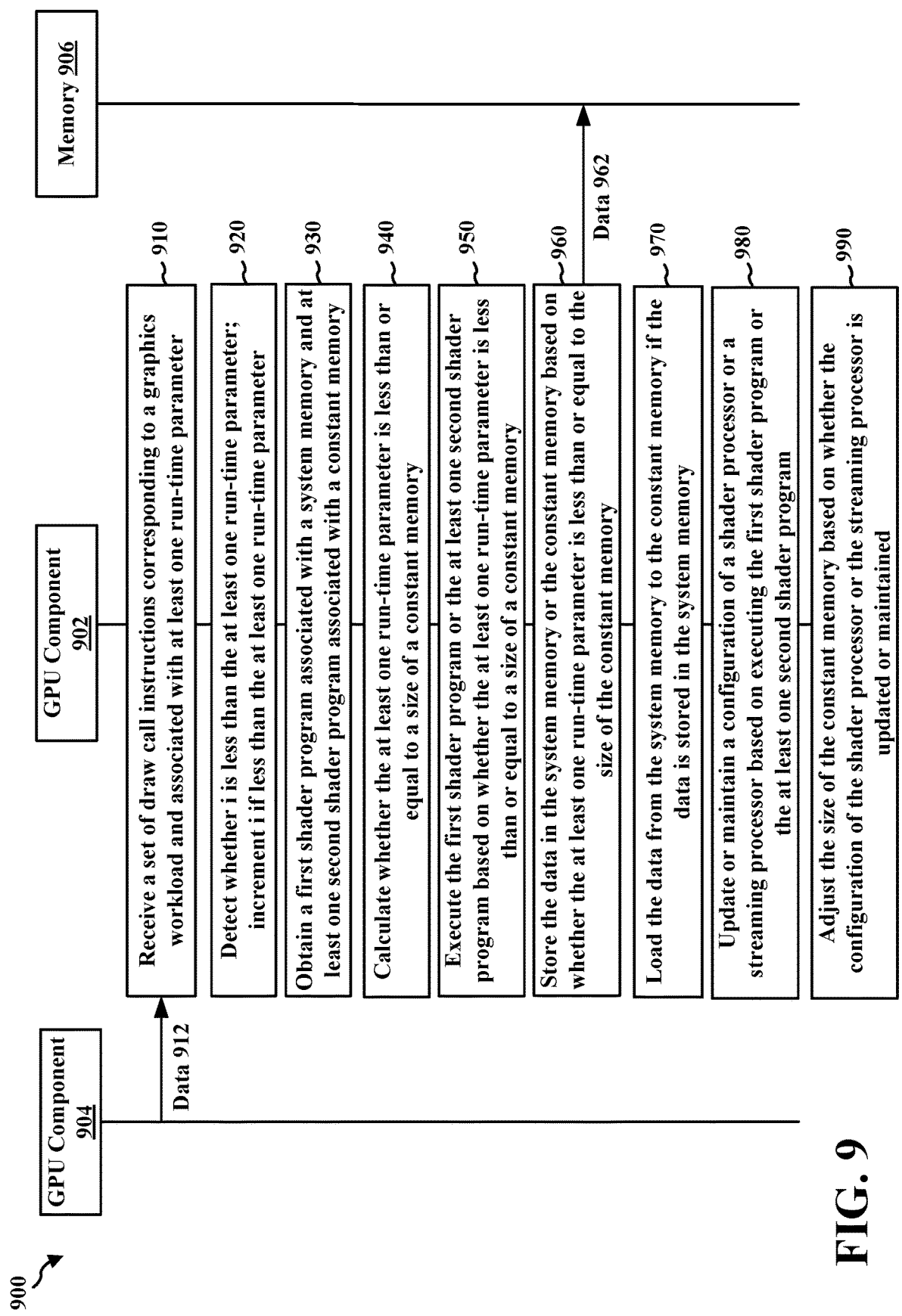
FIG. 9 is a communication flow diagram illustrating example communications between GPU components and a memory.

FIG. 9 is a communication flow diagram 900 of graphics processing in accordance with one or more techniques of this disclosure. As shown in FIG. 9, diagram 900 includes example communications between components of a GPU (or other graphics processor), e.g., GPU component 902, GPU component 904, and memory 906 (e.g., system memory, double data rate (DDR) memory, or constant memory), in accordance with one or more techniques of this disclosure.

At 910, GPU component 902 may receive a set of draw call instructions corresponding to a graphics workload (e.g., receive data 912 from GPU component 904), where the set of draw call instructions is associated with at least one run-time parameter corresponding to information available at a run-time for the graphics workload. In some instances, one parameter of the at least one run-time parameter may be a constant buffer parameter that corresponds to the size of the constant memory or a size of a constant buffer. Also, the at least one run-time parameter may be associated with a texture filtering mode for the graphics workload. The run-time for the graphics workload may be a workload dispatch time at a GPU. Further, the graphics workload may be at least one of a pixel workload at a GPU or a compute workload at a GPU.

At 920, GPU component 902 may detect whether an index value (i) is less than the at least one run-time parameter; and increment the index value (i) if the index value (i) is less than the at least one run-time parameter. The at least one second shader program may be executed and the data may be stored in the constant memory if the index value (i) is incremented.

At 930, GPU component 902 may obtain a first shader program associated with storing data in a system memory and at least one second shader program associated with storing the data in a constant memory. Further, GPU component 902 may generate the first shader program and the at least one second shader program. In some aspects, obtaining the first shader program and the at least one second shader program may include: generating the first shader program and the at least one second shader program. The first shader program may be a default shader program and the at least one second shader program may be an optimized shader program.

At 940, GPU component 902 may calculate whether the at least one run-time parameter is less than or equal to the size of the constant memory, where the first shader program or the at least one second shader program is executed based on whether the at least one run-time parameter is calculated to be less than or equal to the size of the constant memory.

At 950, GPU component 902 may execute the first shader program or the at least one second shader program based on whether the at least one run-time parameter is less than or equal to a size of the constant memory. In some aspects, the first shader program may be executed if the at least one run-time parameter is greater than the size of the constant memory, and the at least one second shader program may be executed if the at least one run-time parameter is less than or equal to the size of the constant memory.

At 960, GPU component 902 may store the data in the system memory or the constant memory (e.g., store data 962 in memory 906) based on whether the at least one run-time parameter is less than or equal to the size of the constant memory. The data may be stored in the system memory if the at least one run-time parameter is greater than the size of the constant memory, and the data may be stored in the constant memory if the at least one run-time parameter is less than or equal to the size of the constant memory. The system memory may be a double data rate (DDR) random access memory (RAM), and the constant memory may be a constant RAM or an on-chip memory. Also, the data may be constant buffer data associated with the constant memory or a constant buffer.

At 970, GPU component 902 may load the data from the system memory to the constant memory if the data is stored in the system memory.

At 980, GPU component 902 may update or maintain a configuration of a shader processor or a streaming processor at a graphics processing unit (GPU) based on executing the first shader program or the at least one second shader program. In some aspects, the configuration of the shader processor or the streaming processor may be maintained as a first configuration if the first shader program is executed, and the configuration of the shader processor or the streaming processor may be updated to a second configuration if the at least one second shader program is executed. Additionally, an amount of a pixel calculation may be reduced if the first shader program is executed and the configuration of the shader processor or the streaming processor is updated.

At 990, GPU component 902 may adjust the size of the constant memory based on whether the configuration of the shader processor or the streaming processor is updated or maintained.

Figure 10:
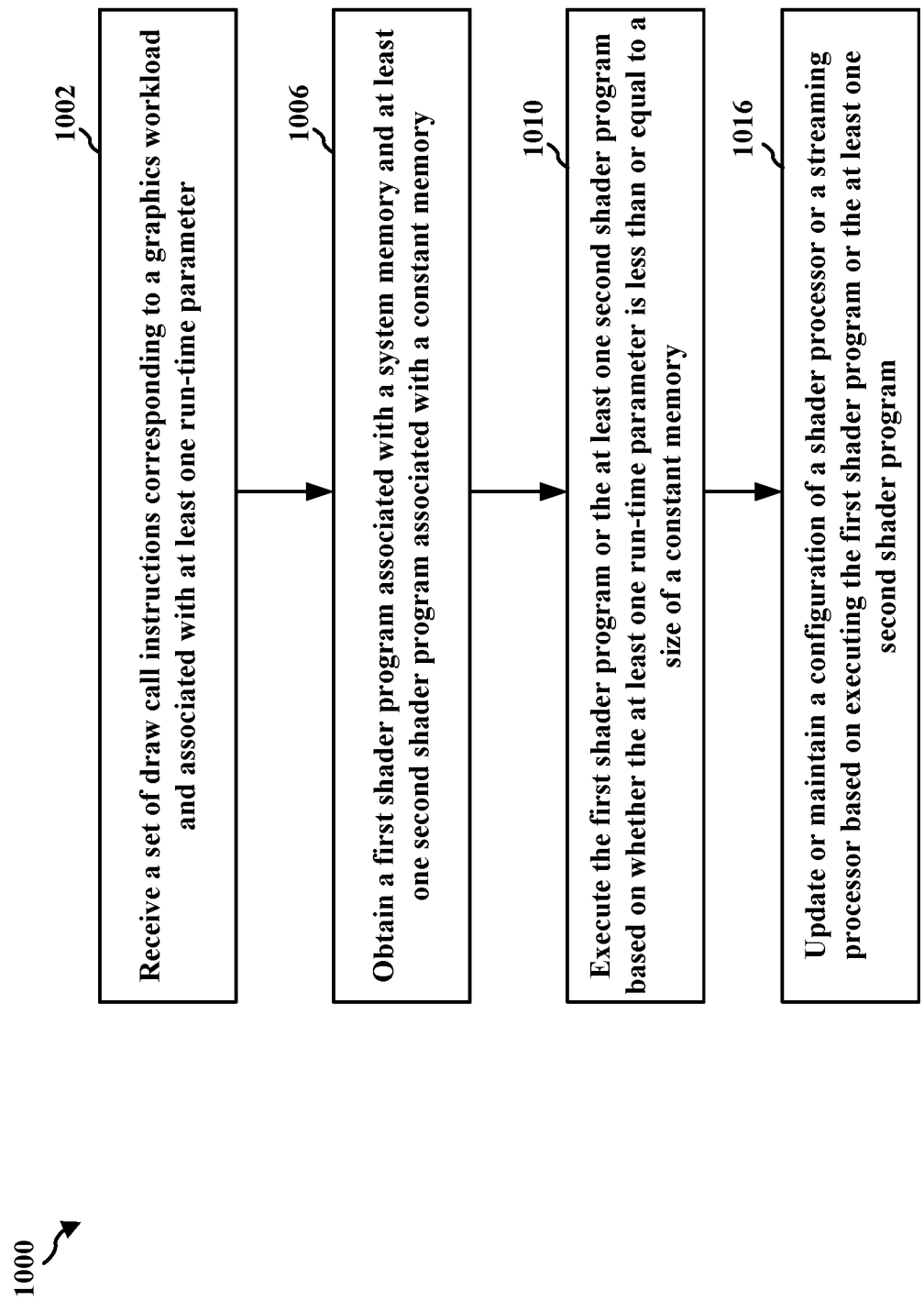
FIG. 10 is a flowchart of an example method of graphics processing.

FIG. 10 is a flowchart 1000 of an example method of graphics processing in accordance with one or more techniques of this disclosure. The method may be performed by a GPU, an apparatus for graphics processing, a graphics processor, a CPU, a wireless communication device, and/or any apparatus that may perform graphics processing as used in connection with the examples of FIGS. 1-9. The methods described herein may provide a number of benefits, such as improving resource utilization and/or power savings.

At 1002, the GPU may receive a set of draw call instructions corresponding to a graphics workload, where the set of draw call instructions is associated with at least one run-time parameter corresponding to information available at a run-time for the graphics workload, as described in connection with the examples in FIGS. 1-9. For example, as described in 910 of FIG. 9, GPU component 902 may receive a set of draw call instructions corresponding to a graphics workload, where the set of draw call instructions is associated with at least one run-time parameter corresponding to information available at a run-time for the graphics workload. Further, step 1002 may be performed by processing unit 120 in FIG. 1. In some instances, one parameter of the at least one run-time parameter may be a constant buffer parameter that corresponds to the size of the constant memory or a size of a constant buffer. Also, the at least one run-time parameter may be associated with a texture filtering mode for the graphics workload. The run-time for the graphics workload may be a workload dispatch time at a GPU. Further, the graphics workload may be at least one of a pixel workload at a GPU or a compute workload at a GPU.

At 1006, the GPU may obtain a first shader program associated with storing data in a system memory and at least one second shader program associated with storing the data in a constant memory, as described in connection with the examples in FIGS. 1-9. For example, as described in 930 of FIG. 9, GPU component 902 may obtain a first shader program associated with storing data in a system memory and at least one second shader program associated with storing the data in a constant memory. Further, step 1006 may be performed by processing unit 120 in FIG. 1. Further, the GPU may generate the first shader program and the at least one second shader program. In some aspects, obtaining the first shader program and the at least one second shader program may include: generating the first shader program and the at least one second shader program. The first shader program may be a default shader program and the at least one second shader program may be an optimized shader program.

At 1010, the GPU may execute the first shader program or the at least one second shader program based on whether the at least one run-time parameter is less than or equal to a size of the constant memory, as described in connection with the examples in FIGS. 1-9. For example, as described in 950 of FIG. 9, GPU component 902 may execute the first shader program or the at least one second shader program based on whether the at least one run-time parameter is less than or equal to a size of the constant memory. Further, step 1010 may be performed by processing unit 120 in FIG. 1. In some aspects, the first shader program may be executed if the at least one run-time parameter is greater than the size of the constant memory, and the at least one second shader program may be executed if the at least one run-time parameter is less than or equal to the size of the constant memory.

At 1016, the GPU may update or maintain a configuration of a shader processor or a streaming processor at a graphics processing unit (GPU) based on executing the first shader program or the at least one second shader program, as described in connection with the examples in FIGS. 1-9. For example, as described in 980 of FIG. 9, GPU component 902 may update or maintain a configuration of a shader processor or a streaming processor at a graphics processing unit (GPU) based on executing the first shader program or the at least one second shader program. Further, step 1016 may be performed by processing unit 120 in FIG. 1. In some aspects, the configuration of the shader processor or the streaming processor may be maintained as a first configuration if the first shader program is executed, and the configuration of the shader processor or the streaming processor may be updated to a second configuration if the at least one second shader program is executed. Additionally, an amount of a pixel calculation may be reduced if the first shader program is executed and the configuration of the shader processor or the streaming processor is updated.

Figure 11:
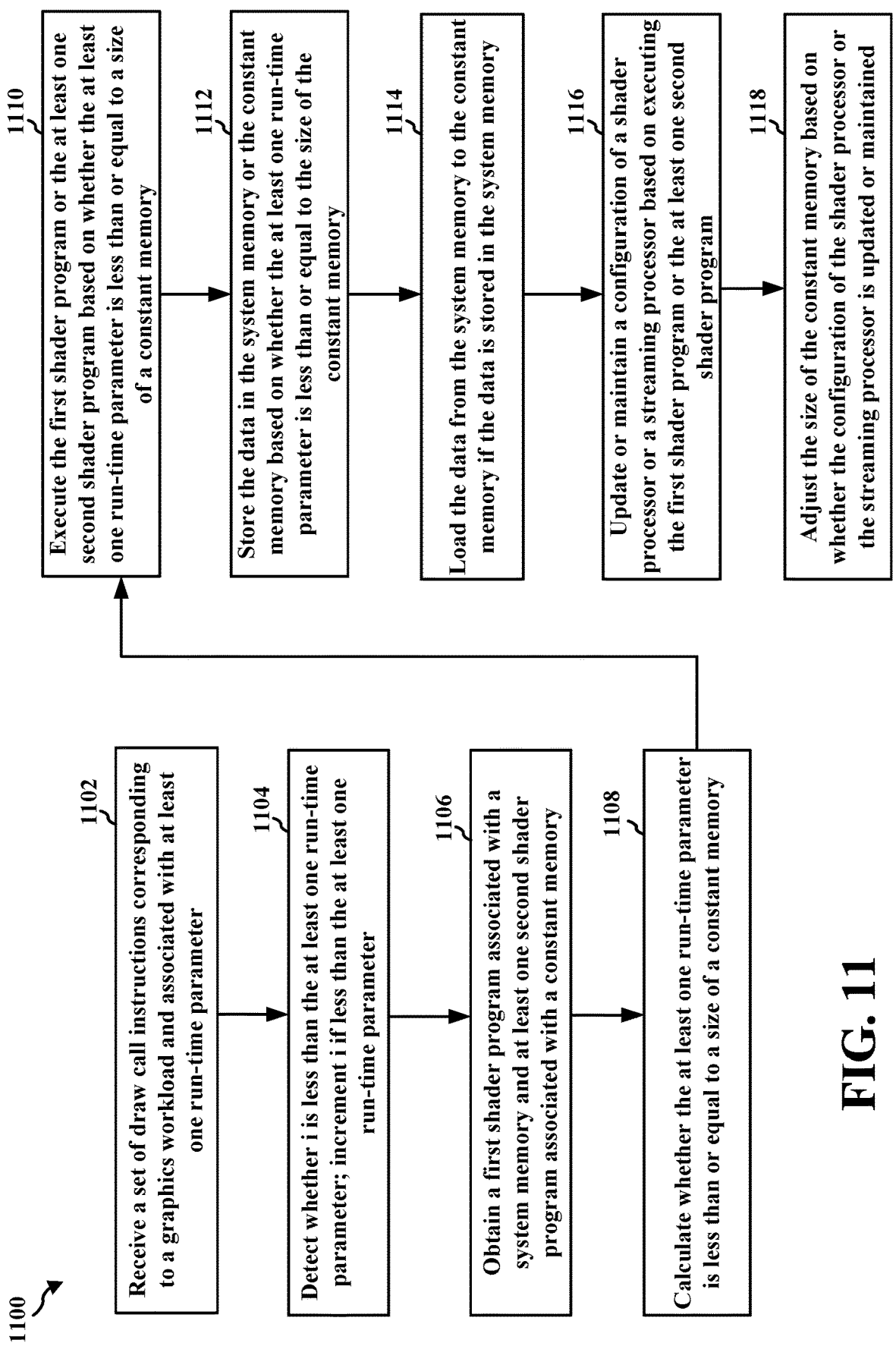
FIG. 11 is a flowchart of an example method of graphics processing.

FIG. 11 is a flowchart 1100 of an example method of graphics processing in accordance with one or more techniques of this disclosure. The method may be performed by a GPU, an apparatus for graphics processing, a graphics processor, a CPU, a wireless communication device, and/or any apparatus that may perform graphics processing as used in connection with the examples of FIGS. 1-9. The methods described herein may provide a number of benefits, such as improving resource utilization and/or power savings.

At 1102, the GPU may receive a set of draw call instructions corresponding to a graphics workload, where the set of draw call instructions is associated with at least one run-time parameter corresponding to information available at a run-time for the graphics workload, as described in connection with the examples in FIGS. 1-9. For example, as described in 910 of FIG. 9, GPU component 902 may receive a set of draw call instructions corresponding to a graphics workload, where the set of draw call instructions is associated with at least one run-time parameter corresponding to information available at a run-time for the graphics workload. Further, step 1102 may be performed by processing unit 120 in FIG. 1. In some instances, one parameter of the at least one run-time parameter may be a constant buffer parameter that corresponds to the size of the constant memory or a size of a constant buffer. Also, the at least one run-time parameter may be associated with a texture filtering mode for the graphics workload. The run-time for the graphics workload may be a workload dispatch time at a GPU. Further, the graphics workload may be at least one of a pixel workload at a GPU or a compute workload at a GPU.

At 1104, the GPU may detect whether an index value (i) is less than the at least one run-time parameter; and increment the index value (i) if the index value (i) is less than the at least one run-time parameter, as described in connection with the examples in FIGS. 1-9. For example, as described in 920 of FIG. 9, GPU component 902 may detect whether an index value (i) is less than the at least one run-time parameter; and increment the index value (i) if the index value (i) is less than the at least one run-time parameter. Further, step 1104 may be performed by processing unit 120 in FIG. 1. The at least one second shader program may be executed and the data may be stored in the constant memory if the index value (i) is incremented.

At 1106, the GPU may obtain a first shader program associated with storing data in a system memory and at least one second shader program associated with storing the data in a constant memory, as described in connection with the examples in FIGS. 1-9. For example, as described in 930 of FIG. 9, GPU component 902 may obtain a first shader program associated with storing data in a system memory and at least one second shader program associated with storing the data in a constant memory. Further, step 1106 may be performed by processing unit 120 in FIG. 1. Further, the GPU may generate the first shader program and the at least one second shader program. In some aspects, obtaining the first shader program and the at least one second shader program may include: generating the first shader program and the at least one second shader program. The first shader program may be a default shader program and the at least one second shader program may be an optimized shader program.

At 1108, the GPU may calculate whether the at least one run-time parameter is less than or equal to the size of the constant memory, where the first shader program or the at least one second shader program is executed based on whether the at least one run-time parameter is calculated to be less than or equal to the size of the constant memory, as described in connection with the examples in FIGS. 1-9. For example, as described in 940 of FIG. 9, GPU component 902 may calculate whether the at least one run-time parameter is less than or equal to the size of the constant memory, where the first shader program or the at least one second shader program is executed based on whether the at least one run-time parameter is calculated to be less than or equal to the size of the constant memory. Further, step 1108 may be performed by processing unit 120 in FIG. 1.

At 1110, the GPU may execute the first shader program or the at least one second shader program based on whether the at least one run-time parameter is less than or equal to a size of the constant memory, as described in connection with the examples in FIGS. 1-9. For example, as described in 950 of FIG. 9, GPU component 902 may execute the first shader program or the at least one second shader program based on whether the at least one run-time parameter is less than or equal to a size of the constant memory. Further, step 1110 may be performed by processing unit 120 in FIG. 1. In some aspects, the first shader program may be executed if the at least one run-time parameter is greater than the size of the constant memory, and the at least one second shader program may be executed if the at least one run-time parameter is less than or equal to the size of the constant memory.

At 1112, the GPU may store the data in the system memory or the constant memory based on whether the at least one run-time parameter is less than or equal to the size of the constant memory, as described in connection with the examples in FIGS. 1-9. For example, as described in 960 of FIG. 9, GPU component 902 may store the data in the system memory or the constant memory based on whether the at least one run-time parameter is less than or equal to the size of the constant memory. Further, step 1112 may be performed by processing unit 120 in FIG. 1. The data may be stored in the system memory if the at least one run-time parameter is greater than the size of the constant memory, and the data may be stored in the constant memory if the at least one run-time parameter is less than or equal to the size of the constant memory. The system memory may be a double data rate (DDR) random access memory (RAM), and the constant memory may be a constant RAM or an on-chip memory. Also, the data may be constant buffer data associated with the constant memory or a constant buffer.

At 1114, the GPU may load the data from the system memory to the constant memory if the data is stored in the system memory, as described in connection with the examples in FIGS. 1-9. For example, as described in 970 of FIG. 9, GPU component 902 may load the data from the system memory to the constant memory if the data is stored in the system memory. Further, step 1114 may be performed by processing unit 120 in FIG. 1.

At 1116, the GPU may update or maintain a configuration of a shader processor or a streaming processor at a graphics processing unit (GPU) based on executing the first shader program or the at least one second shader program, as described in connection with the examples in FIGS. 1-9. For example, as described in 980 of FIG. 9, GPU component 902 may update or maintain a configuration of a shader processor or a streaming processor at a graphics processing unit (GPU) based on executing the first shader program or the at least one second shader program. Further, step 1116 may be performed by processing unit 120 in FIG. 1. In some aspects, the configuration of the shader processor or the streaming processor may be maintained as a first configuration if the first shader program is executed, and the configuration of the shader processor or the streaming processor may be updated to a second configuration if the at least one second shader program is executed. Additionally, an amount of a pixel calculation may be reduced if the first shader program is executed and the configuration of the shader processor or the streaming processor is updated.

At 1118, the GPU may adjust the size of the constant memory based on whether the configuration of the shader processor or the streaming processor is updated or maintained, as described in connection with the examples in FIGS. 1-9. For example, as described in 990 of FIG. 9, GPU component 902 may adjust the size of the constant memory based on whether the configuration of the shader processor or the streaming processor is updated or maintained. Further, step 1118 may be performed by processing unit 120 in FIG. 1.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for receiving a set of draw call instructions corresponding to a graphics workload, where the set of draw call instructions is associated with at least one run-time parameter corresponding to information available at a run-time for the graphics workload; means for obtaining a first shader program associated with storing data in a system memory and at least one second shader program associated with storing the data in a constant memory; means for executing the first shader program or the at least one second shader program based on whether the at least one run-time parameter is less than or equal to a size of the constant memory; means for updating or maintaining a configuration of a shader processor or a streaming processor at a graphics processing unit (GPU) based on executing the first shader program or the at least one second shader program; means for storing the data in the system memory or the constant memory based on whether the at least one run-time parameter is less than or equal to the size of the constant memory; means for loading the data from the system memory to the constant memory if the data is stored in the system memory; means for detecting whether an index value (i) is less than the at least one run-time parameter; means for incrementing the index value (i) if the index value (i) is less than the at least one run-time parameter; means for calculating whether the at least one run-time parameter is less than or equal to the size of the constant memory, where the first shader program or the at least one second shader program is executed based on whether the at least one run-time parameter is calculated to be less than or equal to the size of the constant memory; means for adjusting the size of the constant memory based on whether the configuration of the shader processor or the streaming processor is updated or maintained; and means for generating the first shader program and the at least one second shader program.

The subject matter described herein may be implemented to realize one or more benefits or advantages. For instance, the described graphics processing techniques may be used by a GPU, a graphics processor, or some other processor that may perform graphics processing to implement the run-time mechanisms for optimal shader techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize run-time mechanisms for optimal shader techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Before rendering the graphical contents to the allocated video memory, a clear operation may be needed for a portion of memory to remove the contents rendered in previous frame. Applications may call the API to perform the clear operation, and a driver may translate this API into GPU native commands for the clear operation. There may be a color value along with the clear command, which is called "clear color." When identifying such a clear command, a GPU may overwrite the portion of the memory with the clear color. In some aspects, the memory may be cleared, but not rendered in the current frame. This may occur when a camera is turned away from a scene, or a certain condition is met, and the application may choose to skip rendering the contents as an optimization. This may occur to a transient texture, such as in the middle of the 3D rendering pipeline. Such a transient texture may be first rendered and then used later as an input texture by another draw.

The aforementioned transient texture may be loaded by the TEX (e.g., TEX 630 in SP 620 in FIG. 6) when used as the input texture. As it may be cleared but not rendered, TEX may return the clear color. Effectively this transient texture may be represented by a single value, which is the clear color. Hence, the TEX operation may be replaced by the clear color as an immediate number. Also, the associated memory read traffic may be saved. The impact of this replacement may not be local when the clear color is a certain value (e.g., 0.0). In this case, a few more instructions affected by the TEX loading results may receive 0 values as well. A compiler may detect this and propagate the impact. Additionally, this may reduce the amount of shader instructions.

To replace the TEX operation with the immediate clear color value, a driver may detect the case that a texture is cleared but not rendered, and let the compiler know the IDs and clear colors of these textures. The compiler may prepare at least one more version of the shader in addition to the default version. In the at least one more version, the compiler may replace a TEX operation with the clear color as a constant, and then propagate the impact if the clear color is 0. During the shader preamble, the shader may obtain the IDs and clear colors of the "cleared but not rendered" textures, decide which shader version to use, and issue the corresponding SSS instructions accordingly. Moreover, by utilizing the aforementioned run-time optimization mechanism, there may be a performance improvement (e.g., a 4% FPS uplift) and a workload reduction (e.g., a 1% DDR traffic reduction) by optimizing a single shader. Although the application of aspects presented herein may be focused on a constant optimization use case, there are other categories that a current mechanism may apply as well (e.g., a texture descriptor is known at runtime). In some aspects, if a sample instruction is declared as level of detail (LOD) enabled, but the LOD is a fixed value (i.e., 0), then the hardware may disable a pixel promotion due to the LOD calculation.

Aspect 1 is an apparatus for graphics processing including at least one processor coupled to a memory and configured to: receive a set of draw call instructions corresponding to a graphics workload, where the set of draw call instructions is associated with at least one run-time parameter corresponding to information available at a run-time for the graphics workload; obtain a first shader program associated with storing data in a system memory and at least one second shader program associated with storing the data in a constant memory; execute the first shader program or the at least one second shader program based on whether the at least one run-time parameter is less than or equal to a size of the constant memory; and updating or maintaining a configuration of a shader processor or a streaming processor at a graphics processing unit (GPU) based on executing the first shader program or the at least one second shader program.

Aspect 2 is the apparatus of aspect 1, where the at least one processor is further configured to: store the data in the system memory or the constant memory based on whether the at least one run-time parameter is less than or equal to the size of the constant memory.

Aspect 3 is the apparatus of any of aspects 1 and 2, where the data is stored in the system memory if the at least one run-time parameter is greater than the size of the constant memory, and where the data is stored in the constant memory if the at least one run-time parameter is less than or equal to the size of the constant memory.

Aspect 4 is the apparatus of any of aspects 1 to 3, where the at least one processor is further configured to: load the data from the system memory to the constant memory if the data is stored in the system memory.

Aspect 5 is the apparatus of any of aspects 1 to 4, where the at least one processor is further configured to: detect whether an index value (i) is less than the at least one run-time parameter; and increment the index value (i) if the index value (i) is less than the at least one run-time parameter.

Aspect 6 is the apparatus of any of aspects 1 to 5, where the at least one second shader program is executed and the data is stored in the constant memory if the index value (i) is incremented.

Aspect 7 is the apparatus of any of aspects 1 to 6, where the at least one processor is further configured to: calculate whether the at least one run-time parameter is less than or equal to the size of the constant memory, where the first shader program or the at least one second shader program is executed based on whether the at least one run-time parameter is calculated to be less than or equal to the size of the constant memory.

Aspect 8 is the apparatus of any of aspects 1 to 7, where the configuration of the shader processor or the streaming processor is maintained as a first configuration if the first shader program is executed, and where the configuration of the shader processor or the streaming processor is updated to a second configuration if the at least one second shader program is executed.

Aspect 9 is the apparatus of any of aspects 1 to 8, where an amount of a pixel calculation is reduced if the first shader program is executed and the configuration of the shader processor or the streaming processor is updated.

Aspect 10 is the apparatus of any of aspects 1 to 9, where the at least one processor is further configured to: adjust the size of the constant memory based on whether the configuration of the shader processor or the streaming processor is updated or maintained.

Aspect 11 is the apparatus of any of aspects 1 to 10, where the first shader program is executed if the at least one run-time parameter is greater than the size of the constant memory, and where the at least one second shader program is executed if the at least one run-time parameter is less than or equal to the size of the constant memory.

Aspect 12 is the apparatus of any of aspects 1 to 11, where one parameter of the at least one run-time parameter is a constant buffer parameter that corresponds to the size of the constant memory or a size of a constant buffer.

Aspect 13 is the apparatus of any of aspects 1 to 12, where the at least one run-time parameter is associated with a texture filtering mode for the graphics workload.

Aspect 14 is the apparatus of any of aspects 1 to 13, where the run-time for the graphics workload is a workload dispatch time at the GPU.

Aspect 15 is the apparatus of any of aspects 1 to 14, where the graphics workload is at least one of a pixel workload at the GPU or a compute workload at the GPU.

Aspect 16 is the apparatus of any of aspects 1 to 15, where to obtain the first shader program and the at least one second shader program, the at least one processor is configured to: generate the first shader program and the at least one second shader program.

Aspect 17 is the apparatus of any of aspects 1 to 16, where the first shader program is a default shader program and the at least one second shader program is an optimized shader program.

Aspect 18 is the apparatus of any of aspects 1 to 17, where the system memory is a double data rate (DDR) random access memory (RAM), and where the constant memory is a constant RAM or an on-chip memory.

Aspect 19 is the apparatus of any of aspects 1 to 18, where the data is constant buffer data associated with the constant memory or a constant buffer.

Aspect 20 is the apparatus of any of aspects 1 to 19, where the apparatus is a wireless communication device, further including at least one of an antenna or a transceiver coupled to the at least one processor.

Aspect 21 is a method of graphics processing for implementing any of aspects 1 to 20.

Aspect 22 is an apparatus for graphics processing including means for implementing any of aspects 1 to 20.

Aspect 23 is a non-transitory computer-readable medium storing computer executable code, the code when executed by at least one processor causes the at least one processor to implement any of aspects 1 to 20.

What is claimed is:

1. An apparatus for graphics processing, comprising:
a memory; and
at least one processor coupled to the memory and configured to:
receive a set of draw call instructions corresponding to a graphics workload, wherein the set of draw call instructions is associated with at least one run-time parameter corresponding to information available at a run-time for the graphics workload;
obtain a first shader program associated with storing data in a system memory and at least one second shader program associated with storing the data in a constant memory;
execute the first shader program or the at least one second shader program based on whether the at least one run-time parameter is less than or equal to a size of the constant memory; and
update or maintain a configuration of a shader processor or a streaming processor at a graphics processing unit (GPU) based on executing the first shader program or the at least one second shader program.

2. The apparatus of claim 1, wherein the at least one processor is further configured to:
store the data in the system memory or the constant memory based on whether the at least one run-time parameter is less than or equal to the size of the constant memory.

3. The apparatus of claim 2, wherein the data is stored in the system memory if the at least one run-time parameter is greater than the size of the constant memory, and wherein the data is stored in the constant memory if the at least one run-time parameter is less than or equal to the size of the constant memory.

4. The apparatus of claim 2, wherein the at least one processor is further configured to:
load the data from the system memory to the constant memory if the data is stored in the system memory.

5. The apparatus of claim 1, wherein the at least one processor is further configured to:
detect whether an index value (i) is less than the at least one run-time parameter; and
increment the index value (i) if the index value (i) is less than the at least one run-time parameter.

6. The apparatus of claim 5, wherein the at least one second shader program is executed and the data is stored in the constant memory if the index value (i) is incremented.

7. The apparatus of claim 1, wherein the at least one processor is further configured to:
calculate whether the at least one run-time parameter is less than or equal to the size of the constant memory, wherein the first shader program or the at least one second shader program is executed based on whether the at least one run-time parameter is calculated to be less than or equal to the size of the constant memory.

8. The apparatus of claim 1, wherein the configuration of the shader processor or the streaming processor is maintained as a first configuration if the first shader program is executed, and wherein the configuration of the shader processor or the streaming processor is updated to a second configuration if the at least one second shader program is executed.

9. The apparatus of claim 1, wherein an amount of a pixel calculation is reduced if the first shader program is executed and the configuration of the shader processor or the streaming processor is updated.

10. The apparatus of claim 1, wherein the at least one processor is further configured to:
adjust the size of the constant memory based on whether the configuration of the shader processor or the streaming processor is updated or maintained.

11. The apparatus of claim 1, wherein the first shader program is executed if the at least one run-time parameter is greater than the size of the constant memory, and wherein the at least one second shader program is executed if the at least one run-time parameter is less than or equal to the size of the constant memory.

12. The apparatus of claim 1, wherein one parameter of the at least one run-time parameter is a constant buffer parameter that corresponds to the size of the constant memory or a size of a constant buffer.

13. The apparatus of claim 1, wherein the at least one run-time parameter is associated with a texture filtering mode for the graphics workload.

14. The apparatus of claim 1, wherein the run-time for the graphics workload is a workload dispatch time at the GPU.

15. The apparatus of claim 1, wherein the graphics workload is at least one of a pixel workload at the GPU or a compute workload at the GPU.

16. The apparatus of claim 1, wherein to obtain the first shader program and the at least one second shader program, the at least one processor is configured to: generate the first shader program and the at least one second shader program.

17. The apparatus of claim 1, wherein the first shader program is a default shader program and the at least one second shader program is an optimized shader program.

18. The apparatus of claim 1, wherein the system memory is a double data rate (DDR) random access memory (RAM), and wherein the constant memory is a constant RAM or an on-chip memory.

19. The apparatus of claim 1, further comprising at least one of an antenna or a transceiver coupled to the at least one processor, wherein the apparatus is a wireless communication device, and wherein the data is constant buffer data associated with the constant memory or a constant buffer.

20. A method of graphics processing, comprising:
receiving a set of draw call instructions corresponding to a graphics workload, wherein the set of draw call instructions is associated with at least one run-time parameter corresponding to information available at a run-time for the graphics workload;
obtaining a first shader program associated with storing data in a system memory and at least one second shader program associated with storing the data in a constant memory;
executing the first shader program or the at least one second shader program based on whether the at least one run-time parameter is less than or equal to a size of the constant memory; and
updating or maintaining a configuration of a shader processor or a streaming processor at a graphics processing unit (GPU) based on executing the first shader program or the at least one second shader program.

21. The method of claim 20, further comprising:
storing the data in the system memory or the constant memory based on whether the at least one run-time parameter is less than or equal to the size of the constant memory.

22. The method of claim 21, wherein the data is stored in the system memory if the at least one run-time parameter is greater than the size of the constant memory, and wherein the data is stored in the constant memory if the at least one run-time parameter is less than or equal to the size of the constant memory, and further comprising:
loading the data from the system memory to the constant memory if the data is stored in the system memory.

23. The method of claim 20, further comprising:
detecting whether an index value (i) is less than the at least one run-time parameter; and
incrementing the index value (i) if the index value (i) is less than the at least one run-time parameter, wherein the at least one second shader program is executed and the data is stored in the constant memory if the index value (i) is incremented.

24. The method of claim 20, further comprising:
calculating whether the at least one run-time parameter is less than or equal to the size of the constant memory, wherein the first shader program or the at least one second shader program is executed based on whether the at least one run-time parameter is calculated to be less than or equal to the size of the constant memory.

25. The method of claim 20, wherein the configuration of the shader processor or the streaming processor is maintained as a first configuration if the first shader program is executed, and the configuration of the shader processor or the streaming processor is updated to a second configuration if the at least one second shader program is executed, and wherein an amount of a pixel calculation is reduced if the first shader program is executed and the configuration of the shader processor or the streaming processor is updated.

26. The method of claim 20, further comprising:
adjusting the size of the constant memory based on whether the configuration of the shader processor or the streaming processor is updated or maintained, wherein the first shader program is executed if the at least one run-time parameter is greater than the size of the constant memory, and wherein the at least one second shader program is executed if the at least one run-time parameter is less than or equal to the size of the constant memory.

27. The method of claim 20, wherein one parameter of the at least one run-time parameter is a constant buffer parameter that corresponds to the size of the constant memory or a size of a constant buffer, wherein the at least one run-time parameter is associated with a texture filtering mode for the graphics workload, wherein the run-time for the graphics workload is a workload dispatch time at the GPU, and wherein the graphics workload is at least one of a pixel workload at the GPU or a compute workload at the GPU.

28. The method of claim 20, wherein obtaining the first shader program and the at least one second shader program comprises: generating the first shader program and the at least one second shader program, wherein the first shader program is a default shader program and the at least one second shader program is an optimized shader program, wherein the system memory is a double data rate (DDR) random access memory (RAM), and wherein the constant memory is a constant RAM or an on-chip memory, and wherein the data is constant buffer data associated with the constant memory or a constant buffer.

29. An apparatus for graphics processing, comprising:
means for receiving a set of draw call instructions corresponding to a graphics workload, wherein the set of draw call instructions is associated with at least one run-time parameter corresponding to information available at a run-time for the graphics workload;
means for obtaining a first shader program associated with storing data in a system memory and at least one second shader program associated with storing the data in a constant memory;
means for executing the first shader program or the at least one second shader program based on whether the at least one run-time parameter is less than or equal to a size of the constant memory; and
means for updating or maintaining a configuration of a shader processor or a streaming processor at a graphics processing unit (GPU) based on executing the first shader program or the at least one second shader program.

30. A computer-readable medium storing computer executable code for graphics processing, the code when executed by a processor causes the processor to:
receive a set of draw call instructions corresponding to a graphics workload, wherein the set of draw call instructions is associated with at least one run-time parameter corresponding to information available at a run-time for the graphics workload;
obtain a first shader program associated with storing data in a system memory and at least one second shader program associated with storing the data in a constant memory;
execute the first shader program or the at least one second shader program based on whether the at least one run-time parameter is less than or equal to a size of the constant memory; and
update or maintain a configuration of a shader processor or a streaming processor at a graphics processing unit (GPU) based on executing the first shader program or the at least one second shader program.

\* \* \* \* \*